United States Patent
Schulte et al.

(10) Patent No.: US 12,540,277 B2
(45) Date of Patent: Feb. 3, 2026

(54) WATER-BASED CURABLE COMPOSITION FOR PRODUCTION OF COATINGS COMPRISING PHOSPHORS

(71) Applicant: Evonik Operations GmbH, Essen (DE)

(72) Inventors: Simone Schulte, Essen (DE); Markus Hallack, Schermbeck (DE); Michael Huth, Maintal (DE); Juri Tschernjaew, Aschaffenburg (DE); Stefan Fischer, Soest (DE); Thomas Jüstel, Witten (DE); Franziska Schröder, Steinfurt (DE); Sven Reetz, Gronau (DE)

(73) Assignee: Evonik Operations GmbH, Essen (DE)

( * ) Notice: Subject to any disclaimer, the term of this patent is extended or adjusted under 35 U.S.C. 154(b) by 862 days.

(21) Appl. No.: 17/658,664

(22) Filed: Apr. 11, 2022

(65) Prior Publication Data

US 2022/0325176 A1 Oct. 13, 2022

(30) Foreign Application Priority Data

Apr. 13, 2021 (EP) .................................. 21167981

(51) Int. Cl.
| | | |
|---|---|---|
| C09K 11/77 | (2006.01) | |
| C09D 5/14 | (2006.01) | |
| C09D 5/22 | (2006.01) | |
| C09D 7/61 | (2018.01) | |
| C09K 11/02 | (2006.01) | |
| C09K 11/71 | (2006.01) | |
| C08K 3/36 | (2006.01) | |

(52) U.S. Cl.
CPC ......... C09K 11/77062 (2021.01); C09D 5/14 (2013.01); C09D 5/22 (2013.01); C09D 7/61 (2018.01); C08K 3/36 (2013.01)

(58) Field of Classification Search
CPC ......... C09K 11/77742; C09K 11/7766; C09K 11/77062; C09K 11/717; C09K 11/77212; C09K 11/758; C09K 11/02; C09K 11/025; C09D 5/14; C09D 5/16; C09D 5/22; C09D 7/61; C09D 175/04
See application file for complete search history.

(56) References Cited

U.S. PATENT DOCUMENTS

| | | | |
|---|---|---|---|
| 5,843,566 A * | 12/1998 | Miyauchi | D21H 11/18 162/123 |
| 6,794,445 B2 | 9/2004 | Reusmann et al. | |
| 8,524,261 B2 | 9/2013 | Schmidt et al. | |
| 10,308,820 B2 | 6/2019 | Duerr et al. | |
| 11,713,400 B2 * | 8/2023 | Schulte | C09D 5/22 427/407.1 |
| 2003/0198819 A1 | 10/2003 | Reusmann et al. | |
| 2006/0108910 A1 | 5/2006 | Justel et al. | |
| 2009/0130169 A1 | 5/2009 | Bernstein | |
| 2013/0224071 A1 | 8/2013 | Bernstein | |
| 2014/0131619 A1 | 5/2014 | Greuel et al. | |
| 2014/0161975 A1 | 6/2014 | Takanashi et al. | |
| 2015/0329771 A1 | 11/2015 | Danielec et al. | |
| 2018/0100071 A1 | 4/2018 | Duerr et al. | |
| 2018/0311355 A1 * | 11/2018 | Oldham | A61K 33/244 |
| 2021/0144994 A1 | 5/2021 | Winkler et al. | |
| 2021/0253889 A1 | 8/2021 | Schulte et al. | |
| 2021/0403753 A1 | 12/2021 | Schulte et al. | |
| 2022/0041887 A1 | 2/2022 | Roland et al. | |
| 2022/0325177 A1 | 10/2022 | Schulte et al. | |
| 2022/0403239 A1 | 12/2022 | Fischer et al. | |
| 2023/0295495 A1 | 9/2023 | Schulte et al. | |

(Continued)

FOREIGN PATENT DOCUMENTS

| | | |
|---|---|---|
| CN | 1678713 A | 10/2005 |
| DE | 10 2015 102 427 | 5/2016 |
| EP | 3 020 277 | 5/2016 |

(Continued)

OTHER PUBLICATIONS

Ran et al., "Enhanced UV-Blocking Capabilities of Polylactic Acid Derived from Renewable Sources for Food and Drug Packaging: A Mini Review", Journal of Composites Science, 7, 10, 18 pages. (Year: 2023).*
U.S. Pat. No. 6,794,445, Sep. 21, 2004, 2003/0198819, Reusmann et al.
U.S. Pat. No. 10,308,820, Jun. 4, 2019, 2018/0100071, Duerr et al.
U.S. Appl. No. 17/176,922, filed Feb. 16, 2021, 2021/0253889, Schulte et al.
U.S. Appl. No. 17/395,616, filed Aug. 6, 2021, 2022/0041887, Roland et al.
U.S. Appl. No. 17/355,385, filed Jun. 23, 2021, 2021/0403753, Schulte et al.

(Continued)

*Primary Examiner* — Matthew E. Hoban
*Assistant Examiner* — Lynne Edmondson
(74) *Attorney, Agent, or Firm* — Grüneberg and Myers PLLC

(57) ABSTRACT

A water-based curable composition, for production of coatings having an antimicrobial property, contains at least one film-forming polymer, optionally at least one additive and/or at least one curing agent, and at least one up-conversion phosphor of the general formula (I): $A_{1-x-y-z}B^*_yB_2SiO_4$:$Ln^1_x,Ln^2_z$. In the general formula (I), $x=0.0001$-$0.0500$; $z=0.0000$ or $z=0.0001$ to $0.3000$ with the proviso that: $y=x+z$; A is selected from Mg, Ca, Sr and Ba; B is selected from Li, Na, K, Rb and Cs; B* is selected from Li, Na and K; and preferably B and B* are not the same. Additionally, $Ln^1$ is selected from praseodymium (Pr), erbium (Er), and neodymium (Nd); and $Ln^2$ is gadolinium (Gd). The phosphor, as a result of an aftertreatment, includes at least one material which has a band gap of greater than 6.0 electronvolts (eV) and is hydrolysis-stable.

37 Claims, 9 Drawing Sheets

(56) References Cited

U.S. PATENT DOCUMENTS

2023/0295496 A1    9/2023    Schulte et al.

FOREIGN PATENT DOCUMENTS

| | | |
|---|---|---|
| JP | 2012/165290 A1 | 2/2015 |
| JP | 2016-035062 A | 3/2016 |
| JP | 2021-165368 A | 10/2021 |
| WO | 2009/064845 | 5/2009 |
| WO | 2014/184038 | 11/2014 |
| WO | 2014/187769 | 11/2014 |
| WO | 2019/197076 | 10/2019 |
| WO | 2021/073914 | 4/2021 |
| WO | 2021/073915 | 4/2021 |
| WO | 2022/218662 | 10/2022 |
| WO | 2022/218663 | 10/2022 |

OTHER PUBLICATIONS

U.S. Appl. No. 17/658,681, filed Apr. 11, 2022, 2022/0325177, Schulte et al.

Extended European Search Report dated Sep. 30, 202, in European Patent Application No. 21167981.6, 10 pages.

Kang et al., "Eu-doped barium strontium silicate phosphor particles prepared from spray solution containing $NH_4Cl$ flux by spray pyrolysis", Materials Science and Engineering, vol. 121, 2005, pp. 81-85.

Office Action received for U.S. Appl. No. 17/754,783, mailed on Aug. 12, 2025, 16 pages.

Office Action received for U.S. Appl. No. 17/754,783, mailed on Apr. 22, 2025, 17 pages.

U.S. Appl. No. 17/754,783, filed Apr. 12, 2022, Fischer et al.

* cited by examiner

WATER-BASED CURABLE COMPOSITION FOR PRODUCTION OF COATINGS COMPRISING PHOSPHORS

CROSS-REFERENCE TO RELATED APPLICATIONS

This application claims priority to European Application No. 21167981.6, filed on Apr. 13, 2021, the content of which is hereby incorporated by reference in its entirety.

BACKGROUND OF THE INVENTION

Field of the Invention

The invention relates to a water-based curable composition for the production of coatings having an antimicrobial property, to the use thereof and to coatings produced therefrom and articles coated therewith.

Description of Related Art

Every day, humans are exposed to a huge variety of microorganisms such as bacteria, fungi and viruses. Many of these microorganisms are useful or even necessary. Nevertheless, as well as the less harmful representatives, there are also disease-causing or even deadly bacteria, fungi and viruses.

Microorganisms can be transmitted through daily interaction with other people and contact with articles that have been used by others. Surfaces are given an antimicrobial finish especially in hygiene-sensitive areas. Fields of use are in particular surfaces of medical devices and consumer articles in hospitals, and in outpatient health and welfare facilities. In addition to these, there are surfaces in the public sphere, in the food and drink sector and in animal keeping. The spread of pathogenic microorganisms is a great problem nowadays in the care sector and in medicine, and wherever many humans associate in an enclosed space. A particular risk at present is also the increased occurrence of what are called multiresistant germs that have become insensitive to most antibiotics.

In order to reduce the risk of spread of pathogens via contact surfaces, in addition to standard hygiene measures, antimicrobial technologies and materials are being utilized. Chemical substances or the use of physical methods can have a critical influence on the process of propagation of microorganisms. The physical methods include, for example, heat, cold, radiation or ultrasound, etc. Among the chemical methods, halogens, metal ions, organic compounds and dyes, and certain gases such as ozone, etc., are known.

Even though chemical and physical methods are extremely effective in the destruction of microorganisms in most cases, they have only a short-lived effect, chemical methods promote the development of resistances and are unsuitable for some applications under some circumstances since they lead to destruction of the surfaces to be protected. The greatest disadvantage, however, specifically in the case of chemical organic substances, is the hazard or toxicity to man. Particular substances, for example formaldehyde, which found use as disinfectant for many years, are now suspected of causing cancer or of being extremely harmful to the environment.

Surfaces with antimicrobial action can make a crucial contribution to the solution of these problems. The standard processes nowadays for generation of such antimicrobial properties make use predominantly of active ingredients incorporated into the material, for example silver particles, copper particles, metal oxides thereof or quaternary ammonium compounds. This frequently involves processing the antimicrobial metals, metal oxides or metal oxide mixtures to give nanoparticles and then mixing them into paints, coatings or polymer materials. The broad use of metal particles is questionable since it is barely possible to assess the long-term effect of this heavy metal on man and the environment.

For example, WO 2019/197076 discloses particles finished with a layer containing both antimony tin oxide and manganese oxide. The person skilled in the art is aware that the antimicrobial surfaces are produced on account of the electrochemical characteristics of metals which, in the presence of moisture, develop microscale galvanic cells and, by virtue of the microscale electric fields, germ-killing action.

It is likewise known that UV radiation can be used in medicine or in hygiene, in order, for example, to disinfect water, process gases, air or surfaces. For instance, UV radiation has long been used in drinking water treatment to reduce the number of facultatively pathogenic microorganisms in the water. This is preferably done using UV-C radiation in the wavelength range between 200 nm and 280 nm. The use of electromagnetic radiation with different wavelengths should take account of the different absorption of the different proteins, the amino acids/nucleic acids (e.g. DNA or RNA) present in microorganisms, tissues or cells, and peptide bonds between the individual acids. For instance, DNA/RNA has good absorption of electromagnetic radiation in the wavelength range between 200 and 300 nm, and particularly good absorption between 250 and 280 nm, and so this radiation range is particularly suitable for inactivation or mutation of DNA/RNA. It is thus possible to inactivate pathogenic microorganisms (viruses, bacteria, yeasts, moulds, spores, inter alia) with such irradiation. Depending on the duration and intensity of the irradiation, mutations can be induced or the structure of DNA or RNA can even be destroyed. Thus, metabolically active cells are inactivated and/or their capacity for propagation can be eliminated. What is advantageous about irradiation with UV radiation is that the microorganisms are unable to develop resistance thereto. However, these physical methods require specific apparatuses and generally have to be repeated regularly by trained personnel, which makes it difficult for these methods to be used widely.

Furthermore, as well as direct irradiation with electromagnetic radiation from the wavelength range of UV radiation, the exploitation of the "up-conversion" effect is also known. This uses phosphor particles with which electromagnetic radiation having wavelengths above UV radiation, especially visible light or infrared radiation, can be converted to electromagnetic radiation having shorter wavelength, such that it is possible to achieve the emission of radiation having the desired effect by the individual phosphor particles.

DE 10 2015 102 427 relates to a body that emits in the wavelength range of UV radiation. Phosphor particles are embedded in the body in a near-surface region within the material from which the body is formed or in a coating on the body. All that is stated here in general terms is that the phosphor particles are added directly to a coating to be formed on the material in the course of processing, where the particular material should have a suitable consistency or viscosity. DE 10 2015 102 427 is silent with regard to suitable polymers and additives.

US 2009/0130169 A1 and WO 2009/064845 A2 describe phosphors that can be introduced into polyvinyl chlorides, acryloylbutadienes, polyolefins, polycarbonates, polystyrenes or nylon, which kill pathogenic microorganisms by virtue of the up-conversion property of the phosphors. These are phosphors that are prepared at a temperature of 1800-2900° C. While US 2009/0130169 A1 and WO 2009/064845 A2 do disclose a composition comprising said phosphors having an asserted antimicrobial action, they do not demonstrate either evidence of the up-conversion property or microbiological experiments. The process disclosed in these documents does not result in a phosphor having an up-conversion property, but instead in an amorphous and glass-like product.

Moreover, US 2009/0130169 A1 and WO 2009/064845 A2 are silent as regards the compatibility of the component in the coating composition or the properties of the coating surfaces, such as the paint surfaces, for example. However, the appearance of coating surfaces is paramount for the consumer.

The demands on coatings and paints are diverse. In principle, coating layers or paint coatings have two tasks or functions: the protective and the decorative function. If merely the term "coating layer" should be stated below, both types of coating are intended. They decorate, protect and preserve materials such as wood, metal or plastic. Accordingly, bright and glossy coat layers are required on the one hand, and a continuous coat layer on the other hand for assurance of chemical and mechanical stability, a certain glide over the coatings or a particular feel.

In contrast to WO 2009/064845 A2, the as-yet unpublished patent applications EP 19202910.6 and PCT/EP2020/077798 disclosed phosphors exhibiting up-conversion and the preparation thereof. Such phosphors can convert irradiation with electromagnetic radiation having lower energy and longer wavelength in the range from 2000 to 400 nm, in particular in the range from 800 nm to 400 nm, to electromagnetic radiation having higher energy and shorter wavelength in the range from 400 to 100 nm, preferably in the range from 300 to 200 nm, with the result that they are suitable for use as antimicrobial phosphors in coating layers.

For instance, the as-yet unpublished European patent application EP 21157055.1 describes a composition comprising at least one film-forming polymer, at least one up-conversion phosphor according to the teaching of EP 19202910.6 and PCT/EP2020/077798, optionally at least one additive and optionally at least one curing agent. It was shown that coating layers comprising these phosphors have antimicrobial action without the other properties, in particular the storage stability, being significantly impaired.

However, it was also found that the phosphors prepared by a process according to EP 19202910.6 and PCT/EP2020/077798 are not particularly well suited to water-based coating systems.

The prior art discloses solvent-based, water-based and solvent-free coating materials.

Solvents are used to establish a processible consistency of coating materials. Low molecular weight, organic liquids in which the film formers employed are completely soluble are generally used.

Coatings, coating materials, paints and coating systems are used herein as synonyms.

However, solventborne systems have toxicological and ecological disadvantages. The high content of combustible solvents that are hazardous to health is unfavourable for reasons of health and safety and environmental protection. In addition, the use of solvents is increasingly subject to legal regulations. These arise, inter alia, from various national and international guidelines (EU Decopaint guideline) for limitation of VOC (volatile organic compound) emissions from coating materials and for reduction of the health risk to the processor and user by volatile and semi-volatile compounds (VOCs and SVOCs) (see demands of the Ausschuss für die gesundheitliche Bewertung von Bauprodukten=AgBB [German Committee for Health-related Evaluation of Building Products]) or the certification of buildings according to the Deutsche Gesellschaft für Nachhaltiges Bauen e.V. (DGNB) [German Sustainable Building Council] or Leadership in Energy & Environmental Design (LEED).

Water-based paints and coatings are accordingly used industrially on a large scale."

SUMMARY OF THE INVENTION

It would therefore be desirable to provide a water-based curable composition of the type mentioned in the introduction, with which water-based coatings can be produced which provide protection against microorganisms, where the antimicrobial action should be via the physical route. The curable composition would therefore not be covered by the biocide regulation (Regulation (EU) No. 528/2012 of the European Parliament and of the Council of 22 May 2012 in the current text of 2019), which highly advantageously entails dispensing with approval periods and costs.

Based on the teaching of the European patent applications EP 19202910.6, PCT/EP2020/077798 and EP 21157055.1, the present invention provides a water-based curable composition for the production of coatings having an antimicrobial property, comprising
  at least one film-forming polymer,
  optionally at least one additive,
  optionally at least one curing agent,
  at least one up-conversion phosphor of the general formula (I)

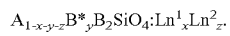

$A_{1-x-y-z}B^*_yB_2SiO_4:Ln^1_xLn^2_z.$ with
x=0.0001-0.0500;
z=0.0000 or z=0.0001 to 0.3000 with the proviso that: y=x+z;
A being selected from the group consisting of Mg, Ca, Sr and Ba;
B being selected from the group consisting of Li, Na, K, Rb and Cs;
B* being selected from the group consisting of Li, Na and K, where B is the same as B* or
B is not the same as B*, and preferably B and B* are not the same;
$Ln^1$ being selected from the group consisting of praseodymium (Pr), erbium (Er) and neodymium (Nd);
$Ln^2$ being selected from gadolinium (Gd),
wherein the phosphor as a result of an aftertreatment includes at least one material which has a band gap of greater than 6 electronvolts (eV) and is hydrolysis-stable.

It was found that the phosphor prepared in accordance with the teaching of European patent applications EP 19202910.6, PCT/EP2020/077798 and EP 21157055.1 no longer exhibits up-conversion once suspended in water.

The invention also includes the following embodiments:
1. Water-based curable composition for the production of coatings having an antimicrobial property, comprising
   at least one film-forming polymer,
   optionally at least one additive.
   optionally at least one curing agent, at least one up-conversion phosphor of the general formula (I)

$$A_{1-x-y-z}B^*{}_yB_2SiO_4: Ln^1{}_x, Ln^2{}_z,$$

with
- $x = 0.0001-0.0500$;
- $z = 0.0000$ or $z = 0.0001$ to $0.3000$ with the proviso that: $y = x+z$;
- A being selected from the group consisting of Mg, Ca, Sr and Ba;
- B being selected from the group consisting of Li, Na, K, Rb and Cs;
- B* being selected from the group consisting of Li, Na and K, where B is the same as B*
- or B is not the same as B*, and preferably B and B* are not the same;
- $Ln^1$ being selected from the group consisting of praseodymium (Pr), erbium (Er) and neodymium (Nd);
- $Ln^2$ being selected from gadolinium (Gd),
- wherein the phosphor as a result of an aftertreatment includes at least one material which has a band gap of greater than 6.0 electronvolts (eV) and is hydrolysis-stable.

2. Composition according to embodiment 1, characterized in that the material has a band gap of at most 12 electronvolts (eV).

3. Composition according to either of the preceding embodiments, characterized in that the material is selected from the group consisting of oxides, silicates, borates, phosphates of an inorganic material, or a mixture thereof.

4. Composition according to any of the preceding embodiments, characterized in that the material is selected from the group consisting of $SiO_2$, $\alpha$-$Al_2O_3$, MgO, $MgAl_2O_4$, Ca polyphosphates, Sr polyphosphates, Ca or Sr pyrophosphate ($Ca_{1-x} Sr_x)P_2O_7$ (with $x=0.0$ to $1.0$), or a mixture thereof.

5. Composition according to any of the preceding embodiments, characterized in that the material has been formed on the phosphor as a result of an aftertreatment with a starting material.

6. Composition according to any of the preceding embodiments, characterized in that the starting materials are selected from the group of the tetraalkyl orthosilicates, in which the alkyl groups identically or differently on each occurrence have 1 to 10 carbon atoms, preferably identically or differently on each occurrence have 1 to 4 carbon atoms.

7. Composition according to any of the preceding embodiments, characterized in that the starting materials are selected from tetramethyl orthosilicate, tetraethyl orthosilicate, tetra-n-propyl orthosilicate, tetraisopropyl orthosilicate and tetrabutyl orthosilicate and/or mixtures thereof.

8. Composition according to any of the preceding embodiments, characterized in that the phosphor after the aftertreatment has a crystalline core with a glass-like or amorphous coat.

9. Composition according to any of the preceding embodiments, characterized in that the phosphor prior to the aftertreatment has been prepared with at least one flux.

10. Composition according to any of the preceding embodiments, characterized in that the flux used is at least one substance from the group of the ammonium halides, alkali metal halides, alkaline earth metal halides and lanthanoid halides.

11. Composition according to any of the preceding embodiments, characterized in that the halides are fluorides, bromides or chlorides.

12. Composition according to any of the preceding embodiments, characterized in that the alkali metals are potassium, sodium or lithium.

13. Composition according to any of the preceding embodiments, characterized in that the lanthanoid is praseodymium.

14. Composition according to any of the preceding embodiments, characterized in that the alkaline earth metals are calcium or strontium.

15. Composition according to any of the preceding embodiments, characterized in that the phosphor has been doped with praseodymium.

16. Composition according to any of the preceding embodiments, characterized in that the phosphor has been doped with praseodymium and co-doped with gadolinium.

17. Composition according to any of the preceding embodiments, characterized in that the phosphor is a crystalline silicate or consists of crystalline silicates doped with lanthanoid ions, comprising at least one alkali metal ion and at least one alkaline earth metal ion, preferably in that the crystalline silicate has been doped with praseodymium and optionally co-doped with gadolinium.

18. Composition according to any of the preceding embodiments, characterized in that the phosphor is at least partially crystalline.

19. Composition according to any of the preceding embodiments, characterized in that the phosphor is selected from compounds of the general formula (Ia)

$$A_{1-x-y-z}B^*{}_yB_2SiO_4:Pr_x,Gd_z. \qquad \text{Ia}$$

with A being selected from the group consisting of Mg, Ca, Sr, Ba;
- B being selected from the group consisting of Li, Na, K, Rb and Cs;
- B* being selected from the group consisting of Li, Na and K, where B is the same as B*
- or B is not the same as B*, and preferably B and B* are not the same;
- $x = 0.0001-0.0500$;
- $z = 0.0000$ or $z = 0.0001$ to $0.3000$ with the proviso that: $y = x+z$.

20. Composition according to any of the preceding embodiments, characterized in that the phosphor is selected from compounds of the general formula (II)

$$(Ca_{1-a}Sr_a)_{1-2b}Ln_bNa_bLi_2SiO_4 \qquad \text{(II)}$$

where:
- Ln is selected from the group consisting of praseodymium, gadolinium, erbium, neodymium, preferably praseodymium;
- $a = 0.0000$ to $1.0000$, preferably $0.0000$ to $0.1000$, especially $0.0000$;
- $b = 0.0001$ to $0.5000$, preferably $0.0001$ to $0.1000$, especially $0.0050$ to $0.0500$.

21. Composition according to any of the preceding embodiments, characterized in that the phosphor is selected from compounds of the general formula (IIa)

$$Ca_{1-2b}Pr_bNa_bLi_2SiO_4 \qquad \text{(IIa)}$$

with $b = 0.0001$ to $0.5000$, preferably $0.0001$ to $0.1000$, especially $0.005$ to $0.0500$.

22. Composition according to any of the preceding embodiments, characterized in that the phosphor is $Ca_{0.98}Pr_{0.01}Na_{0.01}Li_2SiO_4$ or $Ca_{0.94}Pr_{0.03}Na_{0.03}Li_2SiO_4$.
23. Composition according to any of the preceding embodiments, characterized in that the phosphor includes a halogen, corresponding to the halide of the flux.
24. Composition according to any of the preceding embodiments, characterized in that the phosphor which, on irradiation with electromagnetic radiation having lower energy and longer wavelength in the range from 2000 to 400 nm, especially in the range from 800 to 400 nm, emits electromagnetic radiation having higher energy and shorter wavelength in the range from 400 to 100 nm, preferably in the range from 300 to 200 nm, where the intensity of the emission maximum of the electromagnetic radiation having higher energy and shorter wavelength is an intensity of at least $1\cdot10^3$ counts/(mm=*s), preferably higher than $1\cdot10^4$ counts/(mm$^2$*s), particularly preferably higher than $1\cdot10^5$ counts/(mm$^2$*s).
25. Composition according to any of the preceding embodiments, characterized in that the phosphor according to formula (II) has XRPD reflections in the range from 23° 2θ to 27° 2θ and from 34° 2θ to 39.5° 2θ.
26. Composition according to any of the preceding embodiments, characterized in that the film-forming polymer contains functional groups, preferably acidic hydrogens, that are reactive with an isocyanate-containing curing agent or with a catalyst.
27. Composition according to any of the preceding embodiments, characterized in that the film-forming polymer is selected from the group of the hydroxy-functional acrylate polymers, hydroxy-functional polyester polymers, and/or hydroxy-functional polyether polymers, hydroxy-functional cellulose derivatives, amino-functional aspartic polymers or polyester polymers, which reacts with an isocyanate-containing curing agent.
28. Composition according to any of the preceding embodiments, characterized in that the film-forming polymer has low resonance.
29. Composition according to any of the preceding embodiments, characterized in that the transmittance of the film-forming polymer is at least 75%, preferably at least 80% and particularly preferably at least 85%, by means of a twin-beam UV/VIS spectrometer.
30. Composition according to any of the preceding embodiments, characterized in that transmittance is at least 70%, preferably at least 75% and particularly preferably at least 80%, by means of a twin-beam UV/VIS spectrometer.
31. Composition according to any of the preceding embodiments, characterized in that the phosphor has an average particle size of d50=0.1-50 μm, preferably d50=0.1-25 μm, particularly preferably d50=0.1 μm to 5 μm, measured to ISO 13320:2020 and USP 429.
32. Composition according to any of the preceding embodiments, characterized in that the additives are selected from the group of the dispersants, rheology aids, levelling agents, wetting agents, defoamers and UV stabilizers.
33. Composition according to any of the preceding embodiments, characterized in that the curing agent is selected from the group of the aliphatic and cycloaliphatic isocyanates.
34. Composition according to any of the preceding embodiments, characterized in that coatings produced therefrom have antimicrobial action against bacteria, yeasts, moulds, algae, parasites, spores or viruses.
35. Composition according to any of the preceding embodiments, characterized in that coatings produced therefrom have antimicrobial action against
pathogens of nosocomial infections, preferably against *Enterococcus faecium, Staphylococcus aureus, Klebsiella pneumoniae, Acinetobacter baumannii, Pseudomonas aeruginosa, Escherichia coli, Enterobacter, Corynebacterium diphtheriae, Candida albicans*, rotavirus, bacteriophages;
pathogenic environmental organisms, preferably against *Cryptosporidium parvum, Giardia lamblia*, amoebas (*Acanthamoeba* spp., *Naegleria* spp.), *E. coli*, coliform bacteria, faecal streptococci, *Salmonella* spp., *Shigella* spp., *Legionella* spec., *Pseudomonas aeruginosa, Mycobacterium* spp., enteral viruses (e.g. polio and hepatitis A virus);
pathogens in food and drink, preferably against *Bacillus cereus, Campylobacter* spp., *Clostidium botulinum, Clostridium perfringens, Cronobacter* spp., *E. coli, Listeria monocytogenes, Salmonella* spp., *Staphylococcus aureus, Vibrio* spp., *Yersinia enterocolitica*, bacteriophages.
36. Use of the composition according to any of the preceding embodiment sfor the production of dispersions, millbases, adhesives, trowelling compounds, renders, paints, coatings or printing inks, inkjets, grinding resins or pigment concentrates.
37. Use of the composition according to any of embodiments 1 to 32 for the production of coatings having an antimicrobial property.
38. Use of the composition according to any of embodiments 1 to 32 for the coating of substrates in hygiene facilities and hospitals and in the food and drink industry.
39. Article, characterized in that it has been coated at least partly, preferably fully, with the curable composition according to any of embodiments 1 to 32.
40. Phosphor of formula (I), (Ia), (II) or (IIa), characterized in that the phosphor has an essentially crystalline core with a glass-like coat.
41. Phosphor according to embodiment 40, characterized in that the glass-like coat consists of a material having a band gap of greater than 6.0 electronvolts (eV).
42. Phosphor according to embodiment 41, characterized in that the glass-like coat consists of a material having a band gap of less than 12.0 electronvolts (eV).
43. Phosphor according to any of embodiments 40-42, characterized in that the material is selected from the group consisting of oxides, silicates, borates, phosphates of an inorganic material, or a mixture thereof.
44. Phosphor according to any of embodiments 40-43, characterized in that the material is selected from the group consisting of $SiO_2$, $\alpha$-$Al_2O_3$, MgO, $MgAl_2O_4$, Ca polyphosphates, Sr polyphosphates, Ca or Sr pyrophosphate $(Ca_{1-x}Sr_x)_3P_2O_7$ (with x=0.0-1.0), or a mixture thereof.

45. Phosphor according to any of embodiments 40-44, characterized in that the crystalline core has been produced with at least one flux selected from any of embodiments 6-10.

DETAILED DESCRIPTION OF THE INVENTION

Figure 1A:
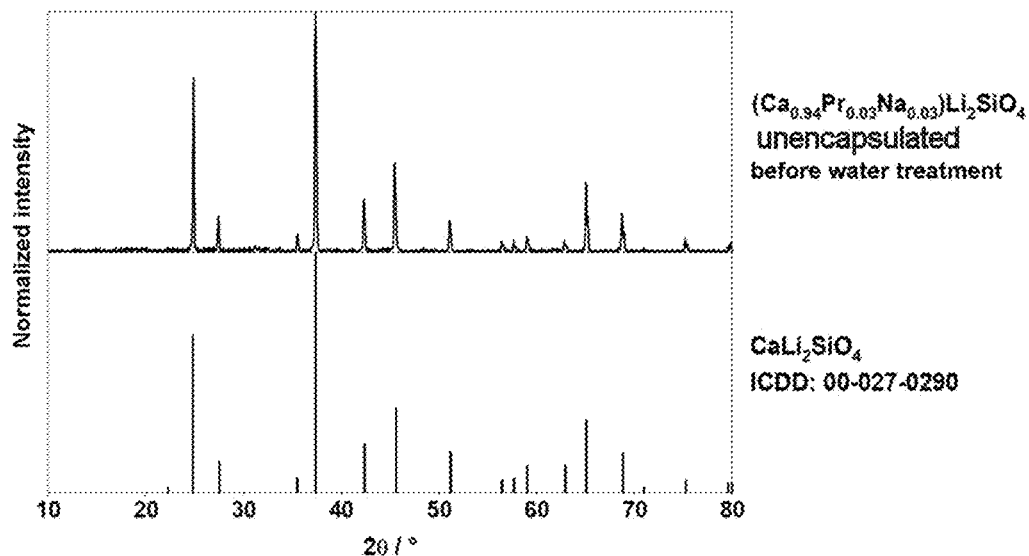
FIG. 1A shows an X-ray powder diffractogram (X-ray diffraction pattern) of the phosphor from Example 1 (top) compared to a reference phosphor (bottom).

Without wishing to be bound to a theory, it is assumed that certain elements of the phosphor enter into solution and hence the crystal lattice structure of the phosphor is disrupted to the extent that the phosphor no longer exhibits up-conversion. The physical antimicrobial action might therefore be lost.

With the now-aftertreated phosphor according to the invention, it was surprisingly possible to create a diffusion barrier such that the water-based curable composition according to the invention may be used for the production of an antimicrobial coating. It has been found, unexpectedly, that the phosphor can convert the wavelength required for the antimicrobial action and in addition is hydrolysis-stable.

Uncoated, non-aftertreated and unencapsulated are understood here to be synonyms, the same also applying analogously to the terms coated, aftertreated and encapsulated.

The band gap of the preferred material might play a role in the diffusion barrier here. For instance, the preferred material allows UV-C radiation (200-280 nm) to pass through without attenuation.

The material preferably has a band gap of not more than 12 electronvolts (eV).

Preferably, the material is selected from the group consisting of oxides, silicates, borates, phosphates of an inorganic material, or a mixture thereof.

The material is preferably selected from the group consisting of $SiO_2$, $\alpha$-$Al_2O_3$, MgO, $MgAl_2O_4$, Ca polyphosphates, Sr polyphosphates, Ca or Sr pyrophosphate ($Ca_{1-x}Sr_x)_3P_2O_7$ (with x=0.0-1.0), or a mixture thereof.

Preferably, the material has been formed on the phosphor as a result of an aftertreatment with a starting material.

Preferred starting materials for the aftertreatment are tetraalkyl orthosilicates, in which the alkyl groups identically or differently on each occurrence have 1 to 10 carbon atoms, preferably identically or differently on each occurrence have 1 to 4 carbon atoms, especially tetramethyl orthosilicate, tetraethyl orthosilicate, tetra-n-propyl orthosilicate, tetraisopropyl 30 orthosilicate and tetrabutyl orthosilicate and/or mixtures thereof.

Particular preference is given to tetraethyl orthosilicate (TEOS), tetramethyl orthosilicate (TMOS), tetraisopropyl orthosilicate (TiPOS), tetrapropyl orthosilicate (TPOS), tetrabutyl orthosilicate (TBOS) and/or a mixture thereof.

Preferred starting materials are also Al alkoxides, such as for example Al methoxide, Al ethoxide, Al propoxide, Al isopropoxide, Al butoxide, or Mg alkoxides, such as for example Mg methoxide, Mg ethoxide, Mg propoxide, Mg isopropoxide, Mg butoxide, or Al and Mg alkoxides, such as for example Al/Mg methoxide, Al/Mg ethoxide, Al/Mg propoxide, Al/Mg isopropoxide, Al/Mg butoxide, or Ca/Sr nitrates, acetates and oxalates and sodium polyphosphate, or sodium pyrophosphate, or a mixture thereof.

Preferably, the phosphor after the aftertreatment has a crystalline core with a glass-like or amorphous coat.

Preferably, the phosphor prior to the aftertreatment has been prepared with at least one flux.

The person skilled in the art is aware of a great number of fluxes of all kinds from the prior art, such as halides, carbonates, sulfates, oxides and borates of, where respectively applicable, ammonium, lithium, sodium, potassium, rubidium, caesium, magnesium, calcium, strontium, barium, lead, lanthanum, lutetium, aluminium, bismuth and boric acid. Also known are their applications in the field of metallurgy, for example for accelerating crystal growth or suppressing the formation of extraneous phases.

The discovery of suitable fluxes was therefore also of particular importance.

It was found, completely surprisingly, that the preparation of the up-conversion phosphors in the presence of at least one halogen-containing flux resulted in up-conversion phosphors having a homogeneous particle size distribution and also increased intensity of the emission or greater quantum yield, compared to phosphors without the addition of a flux or comprising a different flux.

Treatment with fluxes is also called fluxing, that is to say the product has been fluxed.

It has been shown in the examples that the particle size distribution resembles a Gaussian distribution. The particle sizes are more homogeneous, with the result that they can be incorporated into a coating matrix substantially more easily.

It has been found that the particle sizes of the phosphors according to the invention are more homogeneous as a result of the flux. They can thus be incorporated into the coating matrix more easily, which may possibly lead to improved coating properties, such as the appearance of the coating surface, for example the gloss, the feel and the touch.

The intensity of the emission of the up-conversion phosphors could also be achieved through a simple technical implementation of the synthesis.

A further subject of the invention is thus a process for the preparation of these up-conversion phosphors and also the up-conversion phosphors obtainable thereby.

Preferably, the halogen-containing flux used is at least one substance from the group of the ammonium halides, alkali metal halides, alkaline earth metal halides and lanthanoid halides. It has surprisingly been found with halides from this group that up-conversion phosphors prepared using them have a higher emission intensity than with other fluxes.

The halides are preferably fluorides or chlorides.

The alkali metals are preferably potassium, sodium or lithium.

The lanthanoid is preferably praseodymium.

The alkaline earth metals are preferably calcium or strontium.

The phosphor has preferably been doped with praseodymium, which is used in the composition according to the invention.

For the composition according to the invention, the phosphor has preferably been doped with praseodymium and co-doped with gadolinium.

It is preferable that the phosphor is at least partially crystalline. It is thus preferable that the phosphor is partially or fully crystalline. The phosphor is thus preferably at least not entirely amorphous. It is therefore preferable that the phosphor is not an amorphously solidified melt (glass).

The phosphor is preferably a crystalline silicate or consists of crystalline silicates doped with lanthanoid ions, comprising at least one alkali metal ion and at least one alkaline earth metal ion.

For the composition according to the invention, the phosphor is preferably selected from compounds of the general formula (Ia)

$$A_{1-x-y-z}B^*_yB_2SiO_4:Pr_xGd_z, \qquad (Ia)$$

with A being selected from the group consisting of Mg, Ca, Sr, Ba;

B being selected from the group consisting of Li, Na, K, Rb and Cs;

B* being selected from the group consisting of Li, Na and K, where B is the same as B* or B is not the same as B*, and preferably B and B* are not the same;

x=0.0001-0.0500;

z=0.0000 or z=0.0001 to 0.3000 with the proviso that: y=x+z.

B* serves here to balance the charge of the praseodymium or gadolinium substitution.

A here may represent a single element from the group consisting of Mg, Ca, Sr and Ba, or else a combination of two or more elements from this group, i.e., for example A=(Mg$_{a1}$Ca$_{a2}$Sr$_{a3}$B$_{a4}$) with 0≤a1≤1, 0≤a2≤1, 0≤a3≤1, 0≤a4≤1, and with the proviso that: a1+a2+a3+a4=1. A may thus represent (Ca$_{0.9}$Sr$_{0.1}$), for example.

For the composition according to the invention, the phosphor is preferably selected from compounds of the general formula (II)

$$(Ca_{1-a}Sr_a)_{1-2b}Ln_bNa_bLi_2SiO_4 \qquad II$$

where:

Ln is selected from the group consisting of praseodymium, gadolinium, erbium, neodymium, preferably praseodymium;

a=0.0000 to 1.0000, preferably 0.0000 to 0.1000, especially 0.0000;

b=0.0001 to 0.5000, preferably 0.0001 to 0.1000, especially 0.0050 to 0.0500.

Ln here may represent a single element from the group consisting of praseodymium, gadolinium, erbium and neodymium, or else represent a combination of two elements from this group, i.e., for example, Ln=(Ln$^1_x$Ln$^2_y$) where Ln$^1$ and Ln$^2$ are selected from the group consisting of praseodymium, gadolinium, erbium and neodymium, and where x and y are as defined for formulae (I) and (Ia).

Ln$^1$ serves for doping. Preference is given to using praseodymium for the doping. Ln$^2$ serves for optional co-doping. Preference is given to using gadolinium for the optional co-doping. The phosphor has preferably not been co-doped; in other words, Ln preferably represents a single element from the group consisting of praseodymium, gadolinium, erbium and neodymium.

It is even more preferable for the phosphor to be selected from compounds of the general formula (IIa)

$$Ca_{1-2b}Pr_bNa_bLi_2SiO_4 \qquad (IIa)$$

with b=0.0001 to 0.5000, preferably 0.0001 to 0.1, especially 0.005 to 0.0500.

It is very particularly preferable for the phosphor to be Ca$_{0.98}$Pr$_{0.01}$Na$_{0.01}$Li$_2$SiO$_4$.

Preferably, the up-conversion phosphor according to the invention includes a halogen, corresponding to the halide of the flux.

The phosphor is preferably one which, on irradiation with electromagnetic radiation having lower energy and longer wavelength in the range from 2000 to 400 nm, especially in the range from 800 to 400 nm, emits electromagnetic radiation having higher energy and shorter wavelength in the range from 400 to 100 nm, preferably in the range from 300 to 200 nm. It is further preferable for the intensity of the emission maximum of the electromagnetic radiation having higher energy and shorter wavelength to be an intensity of at least 1·10$^3$ counts/(mm$^2$*s), preferably higher than 1·10$^4$ counts/(mm2*s), particularly preferably higher than 1·10$^5$ counts/(mm2*s). For determination of these indices, emission is preferably induced by means of a laser, especially a laser having a power of 75 mW at 445 nm and/or a power of 150 mW at 488 nm.

The phosphor according to formula (II) preferably has XRPD signals in the range from 23° 2θ to 27° 2θ and from 34° 2θ to 39.5° 2θ, the signals being determined by means of the Bragg-Brentano geometry and Cu-K$_\alpha$ radiation. Details of the method of measurement can be found in the as-yet unpublished European patent applications EP 19202910.6 and PCT/EP2020/077798.

The as-yet unpublished European patent applications EP 19202910.6 and PCT/EP2020/077798 are dedicated to the preparation of phosphors, especially of phosphors of formula (I), formula (Ia), and formula (II), without the addition of fluxes and/or the starting materials.

Proceeding from the process described in these documents, the process according to the invention comprises the following steps:

i) providing at least one lanthanoid salt selected from lanthanoid nitrates, lanthanoid carbonates, lanthanoid carboxylates, preferably lanthanoid acetates, lanthanoid sulfates, lanthanoid oxides, more preferably Pr$_6$O$_{11}$ and/or Gd$_2$O$_3$, where the lanthanoid ion in the lanthanoid oxides or lanthanoid salts is selected from praseodymium, gadolinium, erbium, neodymium and, for co-doping, at least two of these,
ii) providing a silicate, preferably a silicate salt, particularly preferably an alkali metal salt of the silicate, or a silicon dioxide,
iii) providing at least one alkaline earth metal salt and at least one alkali metal salt, preferably an alkali metal silicate or an alkali metal carbonate selected from a lithium salt or a lithium compound and optionally selected from a sodium salt and potassium salt, preferably the salt of the lithium salt, preferably a lithium carbonate, a calcium carbonate and a sodium carbonate,
iv) optionally providing at least one flux from the group of the ammonium halides, preferably ammonium chloride, alkali metal halides, preferably sodium chloride, sodium fluoride, sodium bromide, lithium fluoride, lithium chloride, alkaline earth metal halides, preferably calcium chloride, calcium fluoride, and lanthanoid halides, preferably praseodymium fluoride, or praseodymium chloride,
a) mixing i), ii), iii) and optionally iv) by means of grinding to obtain a mixture, or
b) mixing i), ii) and iii) in an organic polar or nonpolar solvent that is not a protic solvent to obtain a mixture; the mixture from b) is calcined (step 1a) at 600 to 1000° C. to remove the organic component; preference is given to performing the calcination at 600 to 1000° C. for at least 1 h, preferably not less than 2 h, under standard (air) atmosphere to obtain a calcined mixture,
calcining the mixture from a) or the calcined mixture from b) in a calcination step, preferably under air at a temperature below the melting temperature of the silicate-based material, wherein at least partial crystallization takes place, preferably in a further calcination step (step 1b) at a temperature of 50 to 200° C. below the melting temperature of the silicate-based material for at least 3 h, preferably under air, in order to crystallize the silicate-based material, preferably at a temperature of 800 to 900° C., particularly preferably at about 850° C., for at least 3 h, preferably for at least 12 h, preferably under air,
in a further calcination step with rising temperature, preferably above 800° C. and 50 to 200° C. below the melting point (step 2) of the material, for example at 850° C. for at least 3 h, particularly preferably for at least 6 h, under a reducing atmosphere, thereby reducing the lanthanoids to Ln$^{3+}$ ions,
obtaining a silicate-based lanthanoid ion-doped material, preferably after cooling the material,
aftertreating the silicate-based lanthanoid ion-doped material with at least one starting material to obtain a material having a band gap of greater than 6.0 electronvolts (eV) on the doped material.

Further detailed embodiments of the process can be gathered from EP 19202910.6 and PCT/EP2020/077798, in which only the flux is used with subsequent aftertreatment with a starting material.

Preferably, 0.01% by weight—3.5% by weight, preferably 0.5%-3.5% by weight, particularly preferably 1.0%-3.5% by weight, of flux can be used, based on the total amount of the reactants.

It is also conceivable to prepare the phosphor according to the invention as follows: Starting materials used are CaCO$_3$ (Alfa Aesar, 99.5%), Li$_2$CO$_3$ (Alfa Aesar, 99%), SiO$_2$ (Aerosil 200, Evonik), Pr$_6$O$_{11}$ (Treibacher, 99.99%), and Na$_2$CO$_3$ (Merck, 99.9%) and also a CaF$_2$ (Sigma-Aldrich, 99.9%) flux. A stoichiometric mixture of these compounds is mixed in acetone for 30 minutes. Once the acetone has evaporated fully at room temperature, the mixture is transferred to a corundum crucible. The mixture is calcined twice. The first calcination is conducted in a melting furnace at 850° C. for 12 h with supply of air, and the second calcination at 850° C. for 6 h under 95/5 N$_2$/H$_2$. The end product is then ground in an agate mortar.

The up-conversion phosphor thus prepared can subsequently preferably be subjected to an aftertreatment with an above-described starting material.

There are many possibilities for conducting the aftertreatment so that the phosphor obtains a substantially crystalline core and a glass-like or amorphous coat consisting of the above-described material.

Proceeding from the above-described process for preparing the phosphor, the aftertreatment according to the invention preferably comprises the following steps:
dispersing the phosphor in an anhydrous medium, preferably comprising an alcohol, such as ethanol, methanol, propanol, butanol, isopropanol, isobutyl alcohol or amyl alcohols,
adding a starting material,
conducting the sol-gel process in the alkaline region, preferably in accordance with the Stöber synthesis, a different sol-gel process or a homogeneous precipitation with urea, urotropin or another hydroxide ion donor,
optionally adding a further starting material,
deagglomerating, preferably by means of ultrasound or stirring with grinding bodies, or by microfluidization,
removing the anhydrous medium and
drying the phosphor.

The starting material can preferably be applied to the phosphor by dropwise addition or in the manner of a spray.

Deagglomeration may preferably also be effected by means of rotor-stator systems, for example using stirrer systems, colloid mills, homogenizers or by means of spray drying.

In a preferred embodiment, the aftertreatment is conducted using a mixture of tetraethyl orthosilicate (TEOS) and tetramethyl orthosilicate (TMOS).

It is also conceivable to optimize the aftertreatment steps by spraying the starting material onto the phosphor by means of fluidized bed, intensive mixers or the Innojet process.

It has been found that, surprisingly, the phosphors in accordance with EP 19202910.6 and PCT/EP2020/077798 have, after the aftertreatment according to the invention, the required up-conversion properties in an aqueous medium that are responsible for the antimicrobial action. In other words, these phosphors can convert electromagnetic radiation having wavelengths above UV radiation, especially visible light or infrared light, to electromagnetic radiation having shorter wavelengths, specifically in the region in which, for example, the DNA or RNA of the microorganisms can be destroyed or mutated. Accordingly, these phosphors are of very good suitability for the composition according to the invention.

The invention further provides a phosphor of formula (I), (Ia), (II) or (IIa), wherein the phosphor has an essentially crystalline core with a glass-like or amorphous coat.

Preferably, the phosphor has a glass-like coat made from a material having a band gap of greater than 6 electronvolts (eV).

Preferably, the phosphor has a glass-like coat made from a material having a band gap of less than 12 electronvolts (eV).

The phosphor preferably includes a material selected from the group consisting of oxides, silicates, borates, phosphates of an inorganic material, or a mixture thereof.

The material is preferably selected from the group consisting of $SiO_2$, $\alpha$-$Al_2O_3$, MgO, $MgAl_2O_4$, Ca polyphosphates, Sr polyphosphates, Ca or Sr pyrophosphate $(Ca_{1-x}Sr_x)_3P_2O_7$ (with x=0.0-1.0), or a mixture thereof.

The phosphor has preferably been prepared using at least one above-described flux and subsequently aftertreated so that the phosphor is hydrolysis-stable.

A further problem addressed by the invention is the selection of film-forming polymers that can be used for the aqueous curable composition having an antimicrobial property. In principle, all film-forming polymers known from the prior art are useful.

The film-forming polymer preferably has functional groups, preferably acidic hydrogens, that are reactive with an isocyanate-containing curing agent, and is optionally catalysed by a catalyst.

"Water-based" is also understood to mean those curable compositions which are dilutable with water or soluble in water.

Advantageously, the film-forming polymer is selected from the group of the hydroxy-functional acrylate polymers, hydroxy-functional polyester polymers, and/or hydroxy-functional polyether polymers, hydroxy-functional cellulose derivatives, amino-functional polyester polymers, or a mixture thereof, which reacts with an isocyanate-containing curing agent.

Preferably, these film-forming polymers are dissolved or emulsified with the aid of a suitable emulsifier in water. The person skilled in the art is aware of suitable anionic, cationic and nonionic emulsifiers.

The film-forming polymer preferably has low resonance.

The person skilled in the art is aware of the physical interactions at the surface. Depending on the material and its material surface, a multitude of effects occur at the surface on incidence of light. The incident light is partly absorbed, partly reflected and, depending on the material surface, also scattered. Light can also first be absorbed and then emitted again. In the case of opaque, semitransparent or transparent materials, the light can also penetrate through the body (transmission). In some cases, the light is even polarized or diffracted at the surface. Some objects can even emit light (illuminated displays, LED segments, display screens), or fluoresce or phosphoresce in light of a different colour (afterglow).

What is meant by "low resonance" in the context of this invention is that the film-forming polymer has low absorption, reflection, remission and scatter in the UV region or in the blue region at 450-500 nm. By contrast, transmittance should preferably be pronounced.

This is because it has been found that, surprisingly, the film-forming polymers according to the invention that have low resonance have improved antimicrobial action, because more electromagnetic radiation having lower energy and higher wavelength in the range from 2000 nm to 400 nm, especially in the range from 800 nm to 400 nm, is transmitted and, as a result, more electromagnetic radiation having higher energy and shorter wavelength in the range from 400 nm to 100 nm, preferably in the range from 300 nm to 200 nm, can be emitted.

It has been found that the higher the transmittance, the higher the emission as well, which is crucial for antimicrobial action.

Preferably, the transmittance of the film-forming polymer is at least 75%, preferably at least 80% and particularity preferably at least 85%, measured at a wavelength of 260 nm.

Preferably, the transmittance of the film-forming polymer is at least 75%, preferably at least 80% and particularly preferably at least 85%, measured at a wavelength of 500 nm. By way of illustration, it should be noted here that transmittance may be defined at a different wavelength; see FIGS. 1A-1G. For the present invention, the wavelengths of 260 nm by way of example for the wavelength emitted and 500 nm by way of example for the excitation wavelength were chosen, which are responsible on the one hand for the up-conversion and on the other to a significant degree for the antimicrobial action.

In the case of 100% transmittance, for example, measured at a wavelength of 260 nm, the same amount of radiation is converted and emitted; in other words, there are no losses through absorption, scatter or the like. In the case of a transmittance of 80%, measured at a wavelength of 260 nm, 20% is not transmitted, probably owing to absorption, reflection, remission and/or scatter. Accordingly, only 80% of the radiation of wavelength 260 nm can be emitted.

This significant finding is important in the selection of the film-forming polymers. Polymers having 0% transmittance, for example, are unsuitable for the curable composition according to the invention. They do not transmit any electromagnetic radiation having lower energy and higher wavelength and, accordingly, phosphors present in the composition cannot convert this electromagnetic radiation to electromagnetic radiation having higher energy and shorter wavelength and emit it, which is required for the antimicrobial action.

Preferably, the composition according to the invention has a transmittance of at least 75%, preferably at least 80% and particularly preferably at least 85%, measured at 260 nm.

Preferably, the composition according to the invention has a transmittance of at least 75%, preferably at least 80% and particularly preferably at least 85%, measured at 500 nm.

The transmittance curves are preferably measured with a "Specord 200 Plus" twin-beam UV/VIS spectrometer from Analytik Jena. A holmium oxide filter is used for internal wavelength calibration. Monochromatic light from a deuterium lamp (UV range) or a tungsten-halogen lamp (visible range) is passed through the samples. The spectral range is 1.4 nm. The monochromatic light is divided into a measurement channel and a reference channel and enables direct measuring against a reference sample. The radiation transmitted through the sample is detected by a photodiode and processed into electrical signals.

It is conceivable to use a composition having a low transmittance of less than 70%; they possibly also have antimicrobial action, but the efficiency is very moderate.

The phosphors preferably have an average particle size of d50 of 0.1-50 µm, preferably d50=0.1-25 µm, particularly preferably d50=0.1 to 5 µm, measured to ISO 13320:2020 and USP 429, for example with an LA-950 Laser Particle Size Analyzer from Horiba.

In order to efficiently incorporate and/or to stabilize the phosphors in the composition according to the invention, it is preferably possible to add various additives.

The additives are preferably selected from the group of the dispersants, rheology aids, levelling agents, wetting agents, defoamers and UV stabilizers.

It has been found that, surprisingly, any addition of additives to the composition according to the invention reduces transmittance.

Accordingly, the composition according to the invention, in a further embodiment in which additives are used, preferably has a transmittance of at least 70%, preferably at least 75% and particularly preferably at least 80%, measured at 260 nm.

Accordingly, the composition according to the invention, in a further embodiment in which additives are used, preferably has a transmittance of at least 70%, preferably at least 75% and particularly preferably at least 80%, measured at 500 nm.

Preferably, the composition according to the invention includes a curing agent selected from the group of the aliphatic or cycloaliphatic isocyanates, or a mixture thereof.

Examples of isocyanate-containing curing agents are monomeric isocyanates, polymeric isocyanates and isocyanate prepolymers. Polyisocyanates are preferred over monomeric isocyanates on account of their lower toxicity. Examples of polyisocyanates are isocyanurates, uretdiones and biurets based on diphenylmethane diisocyanate (MDI), toluene diisocyanate (TDI), hexamethylene diisocyanates (HDI) and isophorone diisocyanate (IPDI). Examples of commercially available products are those under the trade name DESMODUR® from Covestro or VESTANAT from Evonik Industries. Known products are DESMODUR® N3400, DESMODUR® N3300, DESMODUR® N3600 DESMODUR® N75, DESMODUR® XP2580, DESMODUR® Z4470. DESMODUR® XP2565 and DESMODUR® VL from Covestro. Further examples are VESTANAT® HAT 2500 LV, VESTANAT® HB 2640 LV or VESTANAT® T 1890E from Evonik Industries. Examples of isocyanate prepolymers are DESMODUR® E XP 2863, DESMODUR® XP 2599 or DESMODUR® XP 2406 from Covestro. Further isocyanate prepolymers known to the person skilled in the art may be used. Very particular preference is given to hydrophilized isocyanates such as Bayhydur 3100 from Covestro.

It is conceivable to use catalysts for the curing. The catalysts that follow, selected from organic Sn(IV), Sn(II), Zn, Bi compounds or tertiary amines, may be used.

Preference is given to using catalysts selected from the group of the organotin catalysts, cyclic amidines, guanidines or amines, or a mixture thereof.

The curing catalyst is preferably used in amounts of 0.01% to 5.0% by weight, preferably 0.05% to 4.0% by weight and particularly preferably 0.1% to 3% by weight, based on the total weight of the curable composition.

In the case of film-forming polymers that cure through physical drying, the addition of reactive curing agents is not required.

The composition according to the invention may preferably be used in 1K (one-component) coating systems or 2K (two-component) coating systems, in melamine baking systems, or room- or high-temperature systems.

Preferably, coatings produced from the composition according to the invention have antimicrobial action against bacteria, yeasts, moulds, algae, parasites and viruses.

The coatings produced according to the invention preferably have antimicrobial action against pathogens of nosocomial infections, preferably against *Enterococcus faecium, Staphylococcus aureus, Klebsiella pneumoniae, Acinetobacter baumannii, Pseudomonas aeruginosa, Escherichia coli, Enterobacter, Corynebacterium diphtheriae, Candida albicans*, rotavirus, bacteriophages;

facultatively pathogenic environmental organisms, preferably against *Cryptosporidium parvum, Giardia lamblia,* amoebas (*Acanthamoeba* spp., *Naegleria* spp.), *E. coli,* coliform bacteria, faecal streptococci, *Salmonella* spp., *Shigella* spp., *Legionella* spec., *Pseudomonas aeruginosa, Mycobacterium* spp., enteral viruses (e.g. polio and hepatitis A virus);

pathogens in food and drink, preferably against *Bacillus cereus, Campylobacter* spp., 5 *Clostridium botulinum, Clostridium perfringens, Cronobacter* spp., *E. coli, Listeria monocytogenes, Salmonella* spp., *Staphylococcus aureus, Vibrio* spp., *Yersinia enterocolitica,* bacteriophages.

It has been found that the incorporation of the up-conversion phosphors according to the invention was markedly improved.

Up-conversion phosphors and phosphors are used as synonyms.

The invention further provides for the use of the composition according to the invention for the production of dispersions, millbases, adhesives, trowelling compounds, renders, paints, coatings or printing inks, inkjets, grinding resins or pigment concentrates.

Preference is given to the use of the composition according to the invention for the production of coatings having an antimicrobial property.

What is meant here by a coating having antimicrobial action or an antimicrobial property is that the coating has an antimicrobial surface that limits or prevents the growth and propagation of microorganisms.

It has also been found that, astonishingly, the coatings according to the invention have chemical and mechanical stability. Chemical and mechanical stability is particularly important since antimicrobial coatings are frequently used in areas that require regular disinfection and further hygiene measures.

The invention also includes a process for forming an antimicrobial coating on a substrate, comprising the application of a curable film-forming composition to the substrate, comprising:

a. at least one film-forming polymer containing functional groups which are reactive with an isocyanate-containing curing agent, optionally catalysed by a catalyst, b. at least one phosphor of the formula (II) and c. a curing agent containing isocyanate-functional groups.

Preferably, the substrate is metal, mineral substrates (for instance concrete, natural rock or glass), cellulosic substrates, wood and hybrids thereof, dimensionally stable plastics and/or thermosets.

The term "dimensionally stable plastics" is understood to mean, albeit non-exhaustively, the following polymers: acrylonitrile-butadiene-styrene (ABS), polyamides (PA), polylactate (PLA), polymethyl methacrylate (PMMA), polycarbonate (PC), polyethylene terephthalate (PET), polystyrene (PS), polyether ether ketone (PEEK), polyvinyl chloride (PVC), polypropylene (PP), polyethylene (PE).

Preferably, a primer composition may be applied to the substrate prior to the application of the curable film-forming composition.

Preferably, the curable composition according to the invention is used for the coating of substrates in hygiene facilities and hospitals and in the food and drink industry.

This includes all settings in the public sphere, for example schools, old people's homes, industrial kitchens or nurseries.

A further invention is an article that has been coated at least partly, preferably fully, with the curable composition according to the invention.

It should be noted here that the terms "antimicrobial effect", "antimicrobial efficacy", "antimicrobial action" and "antimicrobial property" are used as synonyms.

It should be noted here that the article according to the invention may preferably have antimicrobial action even without release of an antimicrobial active ingredient if the coating comprises specific phosphors as described. In this way, the route via which the microorganisms are then killed is physical. Therefore, such materials are not covered by the biocide regulation (Regulation (EU) No 528/2012 of the European Parliament and of the Council of 22 May 2012 in the current text of 2019).

Adduced hereinafter are examples that serve solely to elucidate this invention to the person skilled in the art and do not constitute any restriction at all of the subject-matter as described.

Methods

Scanning electron microscopy was conducted using an EVO MA 10 scanning electron microscope from Zeiss. The scanning electron microscope was operated with an $LaB_6$ cathode and an acceleration voltage of 10 kV at 2 pA. Prior to the measurement, the sample chamber was evacuated to a value of approx. $5*10^{-9}$ mbar. The topography contrast was evaluated by detecting secondary electrons. The maximum resolution was 10 nm.

Powder XRD: The X-ray powder diffractograms of the samples were recorded using a Panalytical X'Pert PRO MPD diffractometer operating in Bragg-Brentano geometry, using Cu-$K_\alpha$ radiation and a line scan CCD detector. The integration time was 20 s and the step width was 0.017° 2θ.

The emission spectra were recorded with the aid of an Edinburgh Instruments FLS920 spectrometer equipped with a 488 nm continuous-wave OBIS laser from Coherent and a Peltier-cooled (−20° C.) single-photon counting photomultiplier from Hamamatsu (R2658P). Bandpass filters were used to suppress nth-order reflections caused by the monochromators.

The conductivity was determined using a 703 laboratory conductivity meter from Knick. For this, 0.1 g of the sample was dispersed in 200 ml of water at 300 rpm and at room temperature. After immersing the measuring electrode into the dispersion, the conductivity was measured over a period of 30 min, a measurement value being recorded every 30 s. After this, the sample was filtered off and dried overnight at 150° C. in a drying cabinet for further measurements, such as XRD and emission measurements.

Example 1 Preparation of a Phosphor $(Ca_{0.94}Pr_{0.03}Na_{0.03})Li_2SiO_4$ 2.8225 g (28.2 mmol) of $CaCO_3$, 2.2167 g (30.0 mmol) of $Li_2CO_3$, 1.8025 g (30.0 mmol) of $SiO_2$, 0.0477 g (0.45 mmol) of $Na_2CO_3$ and 0.1781 g (0.9 mmol) of $PrF_3$ were mixed in acetone in an agate mortar. This mixture was calcined at 850° C. for 12 h in air to remove organic constituents. The calcination is then conducted at 850° C. for a further 6 h in a forming gas atmosphere (5% $H_2$/95% $N_2$), which results in the desired product. The phosphor was withdrawn for further measurements.

Example 1.1 Phosphor According to the Invention

Aftertreatment of the phosphor $(Ca_{0.94}Pr_{0.03}Na_{0.03})Li_2SiO_4$ with 36% by weight of $SiO_2$ based on the phosphor 15 g of the phosphor was suspended in 300 ml of dried ethanol for 30 minutes in an ultrasound bath and was subsequently decanted in order to obtain the solid phase. This procedure was performed twice. The phosphor was then added to 360 ml of dried ethanol and 0.6 ml of TMOS was added. After 10 minutes in the ultrasound bath, 45 ml of conc. $NH_3$ was added thereto with stirring. A TEOS/ETOH mixture, consisting of 20 ml of TEOS and 60 ml of ethanol, was then added thereto dropwise within 1 h. The ultrasound was activated every 10 min for 10 s during this hour. This dispersion was then stirred for 3 h and the ultrasound was activated every 15 min for 10 s. This solid phase was filtered off and washed with dried ethanol. It was then dried overnight at 200° C.

FIG. 1A shows an X-ray powder diffractogram (X-ray diffraction pattern) of the phosphor from Example 1 (top diagram) compared to a reference phosphor (bottom normalized X-ray powder diffractogram). It was shown that the desired phosphor was prepared.

Figure 1B:
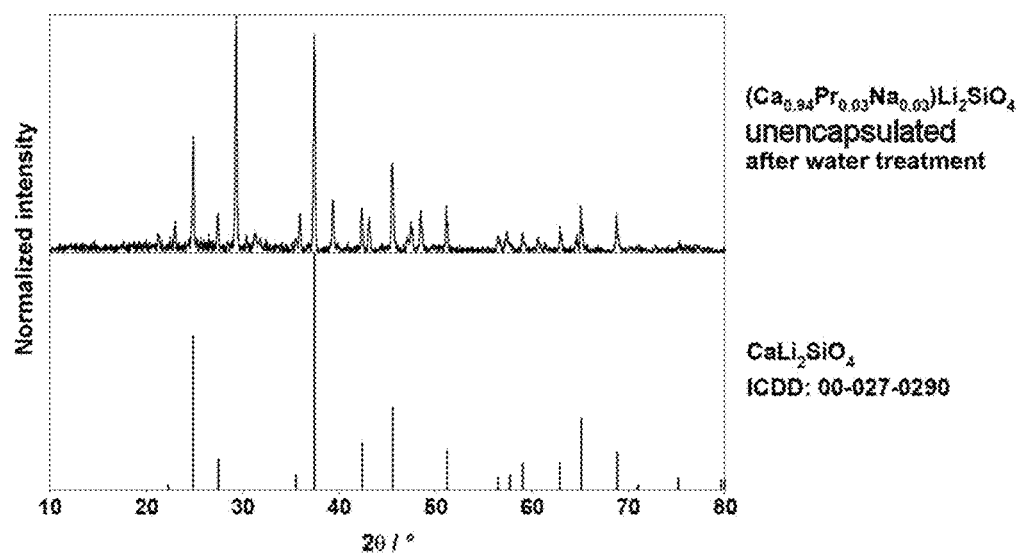
FIG. 1B shows an X-ray powder diffractogram (X-ray diffraction pattern) of the phosphor from Example 1 (top), wherein this has been suspended in water.

FIG. 1B shows an X-ray powder diffractogram (X-ray diffraction pattern) of the phosphor from Example 1 (top diagram), wherein this has been suspended in water. It was found that the phosphor had changed. It is assumed that certain elements have leached out of the crystal lattice structure.

FIG. 1A and FIG. 1B show the instability of the non-aftertreated phosphor in water.

Figure 1C:
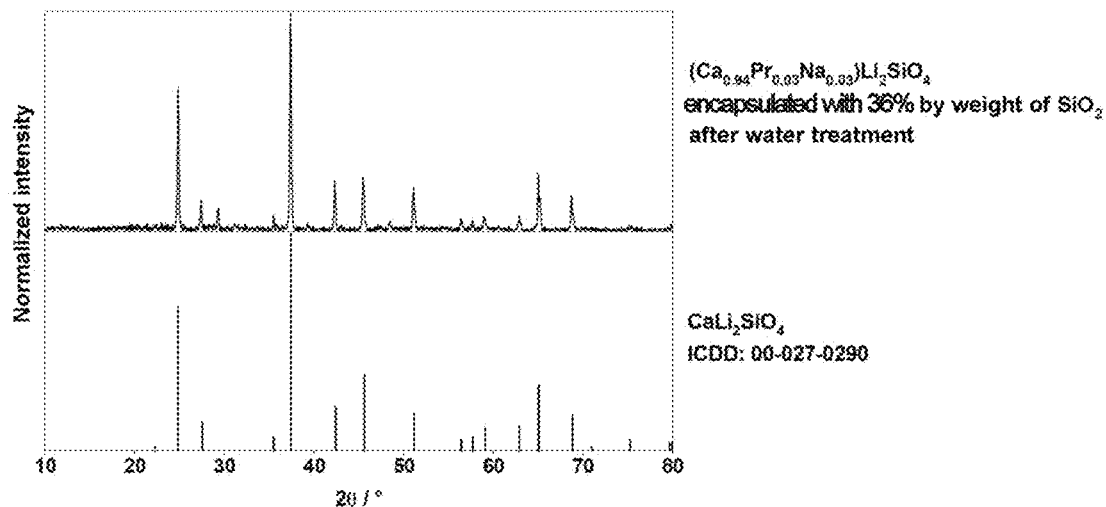
FIG. 1C shows an X-ray powder diffractogram (X-ray diffraction pattern) of the phosphor from Example 1.1 (top) compared to a reference phosphor (bottom).

FIG. 1C shows an X-ray powder diffractogram (X-ray diffraction pattern) of the phosphor from Example 1.1 (top diagram) compared to a reference phosphor (bottom normalized X-ray powder diffractogram). It was shown that the desired phosphor was prepared.

Figure 1D:
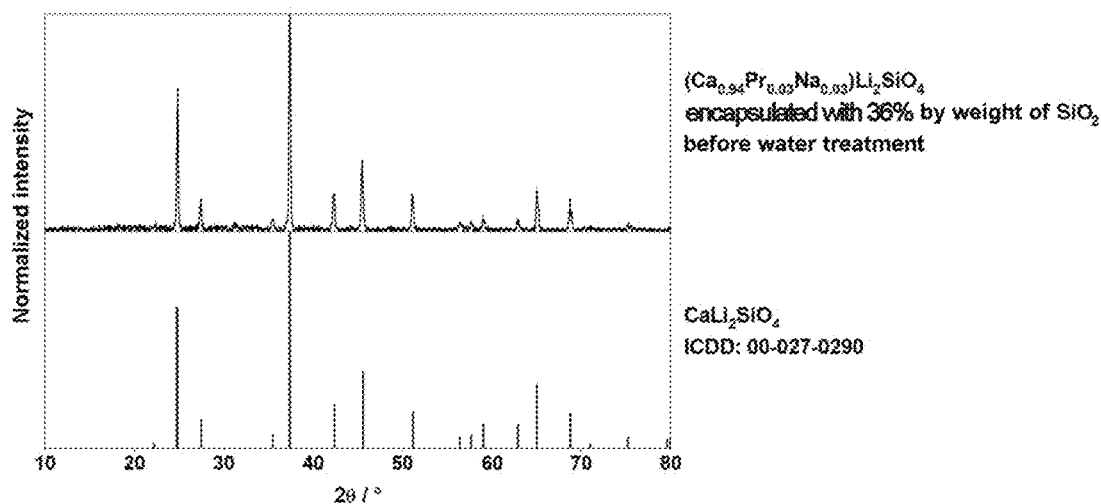
FIG. 1D shows an X-ray powder diffractogram (X-ray diffraction pattern) of the phosphor from Example 1.1 (top), wherein this has been suspended in water.

FIG. 1D shows an X-ray powder diffractogram (X-ray diffraction pattern) of the phosphor from Example 1.1 (top diagram), wherein this has been suspended in water. It was found that the phosphor had not changed.

Figure 1E:
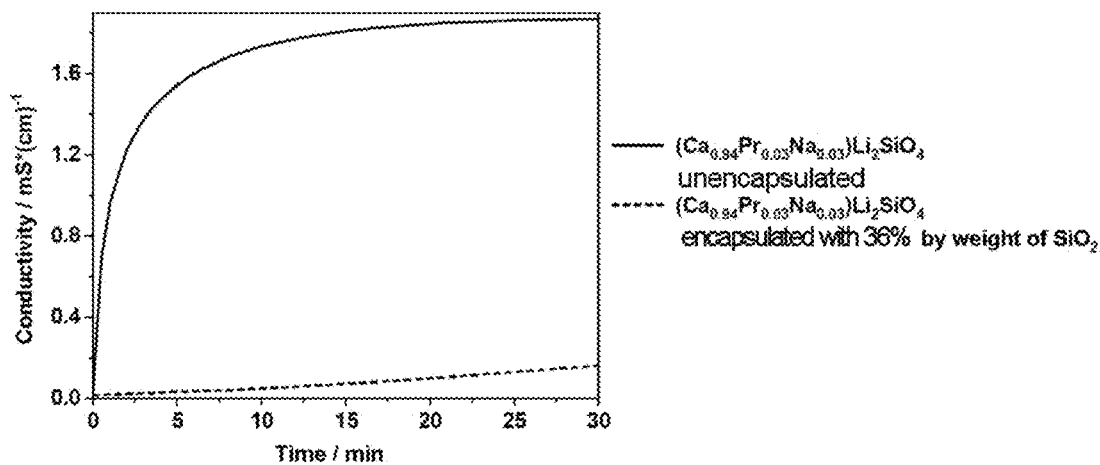
FIG. 1E shows the conductivity of the aftertreated and non-aftertreated phosphor which had previously been suspended in water.

FIG. 1E shows the conductivity of the aftertreated and non-aftertreated phosphor which had previously been suspended in water. It is evident that the aftertreated phosphor exhibited virtually no conductivity. The phosphor according to the invention is therefore hydrolysis-stable.

Figure 1F:
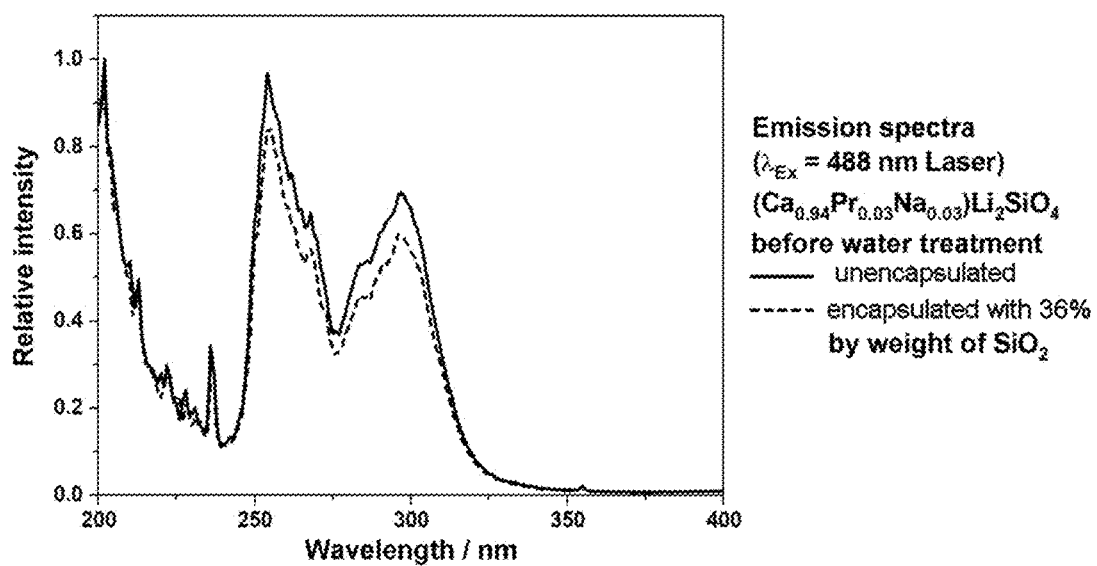
FIG. 1F shows an emission spectrum of Example 1.1 (dashed line) compared to a comparative phosphor of Example 1, before the phosphor was suspended in water.

FIG. 1F shows an emission spectrum of Example 1.1 (dashed line) compared to a comparative phosphor of Example 1. The measurement was conducted before the phosphor was suspended in water. The spectrum clearly shows that the intensity of both phosphor samples are within the desired wavelength range. The phosphor according to the invention hardly loses intensity as a result of the aftertreatment.

Figure 1G:
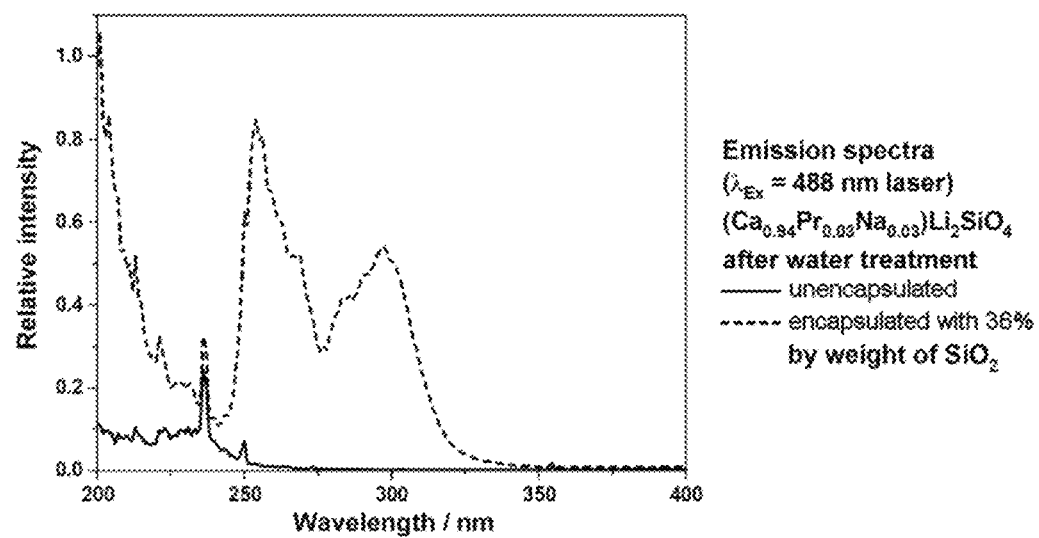
FIG. 1G shows an emission spectrum of Example 1.1 (dashed line) compared to a comparative phosphor of Example 1, after these had been suspended in water.

FIG. 1G shows an emission spectrum of Example 1.1 (dashed line) compared to a comparative phosphor of Example 1, after these had been suspended in water. It is clearly apparent that the non-aftertreated phosphor no longer exhibits any up-conversion, meaning that it would no longer have any physical antimicrobial action. The phosphor according to the invention can be used in a water-based composition according to the invention which can be used to produce coatings having antimicrobial action.

Example 2 Phosphor According to the Invention

Aftertreatment of the phosphor $(Ca_{0.94}Pr_{0.03}Na_{0.03})Li_2SiO_4$ with 72% by weight of $SiO_2$ based on the phosphor The aftertreatment was conducted analogously to Example 1.1, using the TEOS/ETOH mixture consisting of 40 ml of TEOS and 60 ml of ethanol.

Figure 2A:
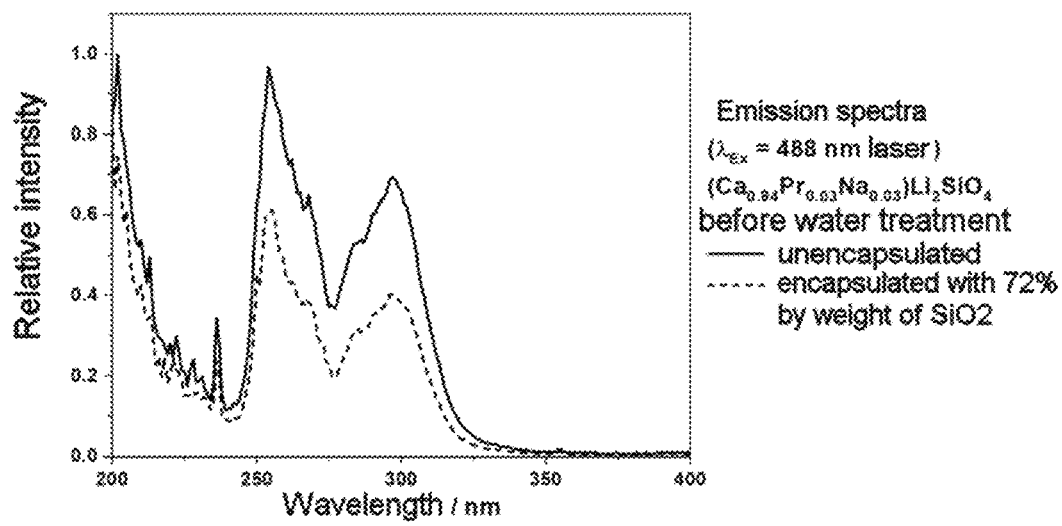
FIG. 2A shows an X-ray powder diffractogram (X-ray diffraction pattern) of the phosphor from Example 2 (top) compared to a reference phosphor (bottom).

FIG. 2A shows an X-ray powder diffractogram (X-ray diffraction pattern) of the phosphor from Example 2 (top diagram) compared to a reference phosphor (bottom normalized X-ray powder diffractogram). It was shown that the desired phosphor was prepared.

Figure 2B:
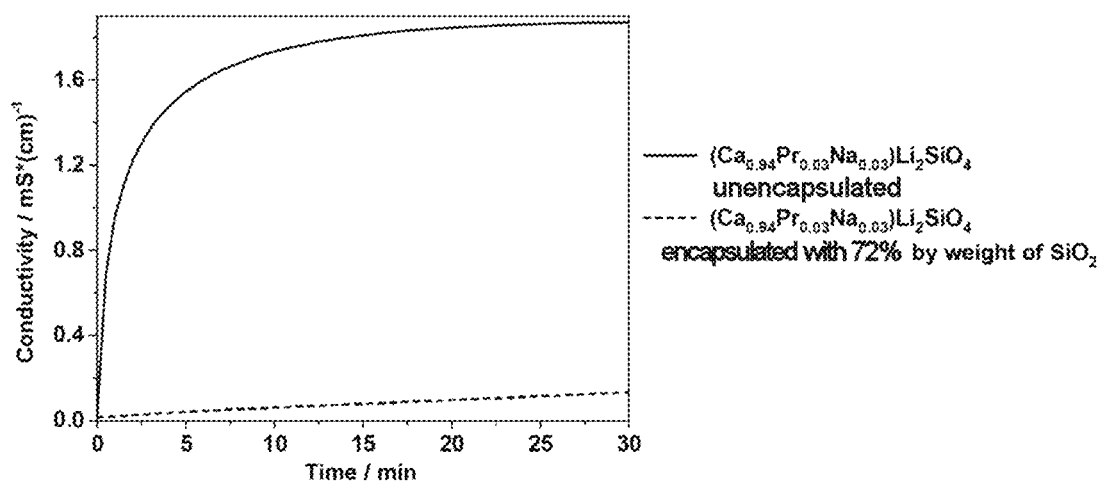
FIG. 2B shows the conductivity of the aftertreated phosphor according to Example 2 and non-aftertreated phosphor, these having previously been suspended in water.

FIG. 2B shows the conductivity of the aftertreated phosphor according to Example 2 and non-aftertreated phosphor, these having previously been suspended in water. It is evident that the aftertreated phosphor exhibited virtually no conductivity. The phosphor according to the invention is thus hydrolysis-stable.

Comparative Example

Example 3: Aftertreatment of the Phosphor $(Ca_{0.94}Pr_{0.03}Na_{0.03})Li_2SiO_4$ with 5% by Weight of $Y_2O_3$ Based on the Phosphor 1 g of $(Ca_{0.94}Pr_{0.03}Na_{0.03})Li_2SiO_4$ was mixed with 0.05 g of $Y_2O_3$ in an agate bowl.

Figure 3A:
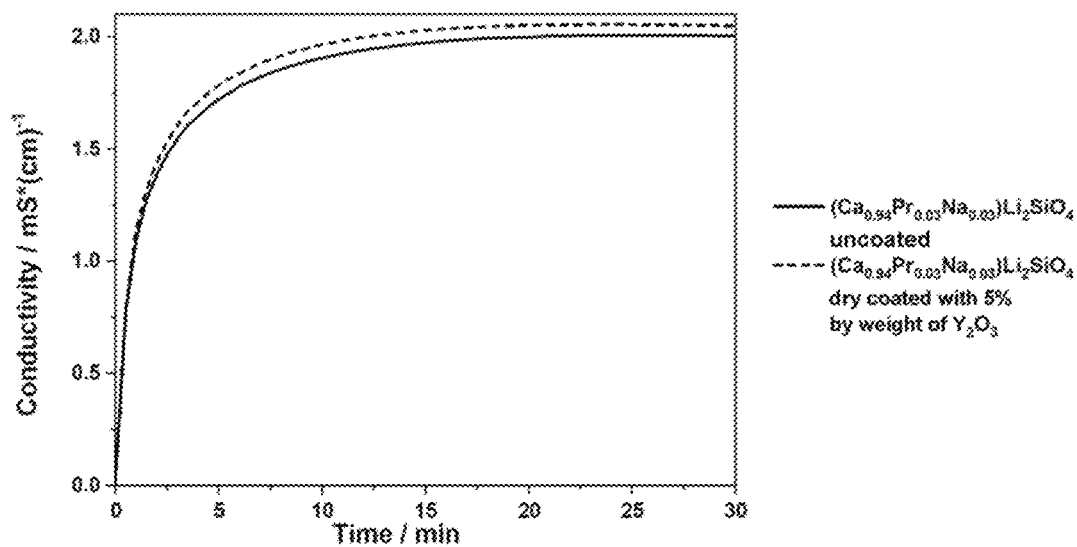
FIG. 3A shows the conductivity of the aftertreated phosphor according to Example 3 and non-aftertreated phosphor according to Example 1, these having previously been suspended in water.

FIG. 3A shows the conductivity of the aftertreated phosphor according to Example 3 and non-aftertreated phosphor according to Example 1, these having previously been suspended in water. It is evident that neither phosphor is hydrolysis-stable. The material $Y_2O_3$ is clearly unsuitable for establishing a diffusion barrier.

Figure 3B:
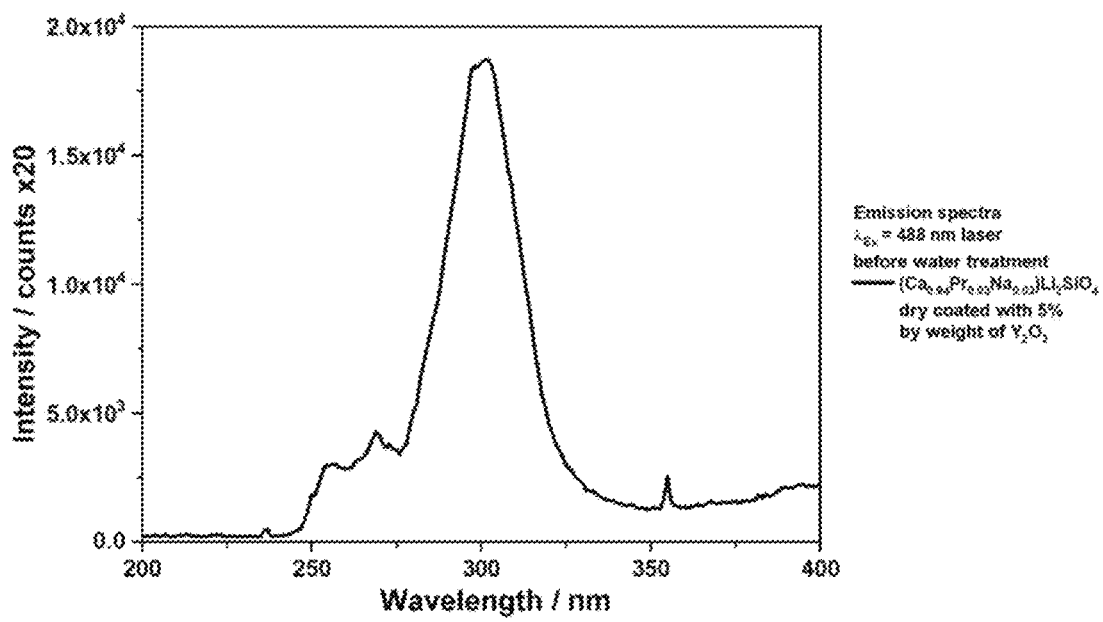
FIG. 3B shows an emission spectrum of Example 3 before the phosphor had been suspended in water.

FIG. 3B shows an emission spectrum of Example 3 before the phosphor had been suspended in water. The phosphor exhibited the desired wavelength range.

Figure 3C:
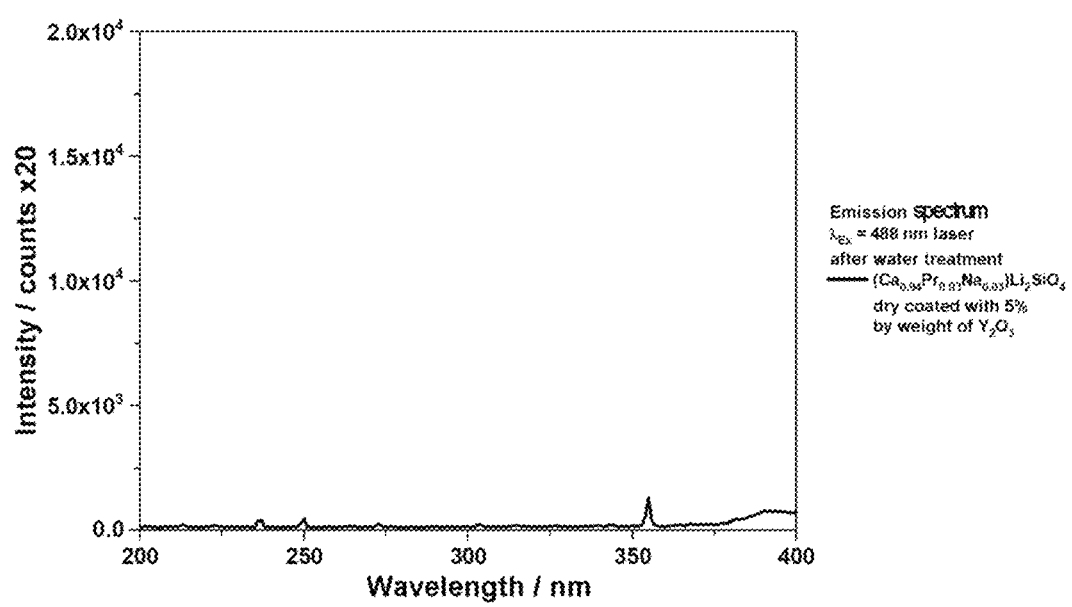
FIG. 3C shows an emission spectrum of Example 3 after the phosphor had been suspended in water.

FIG. 3C shows an emission spectrum of Example 3 after the phosphor had been suspended in water. The phosphor lost all of its intensity.

Figure 3D:
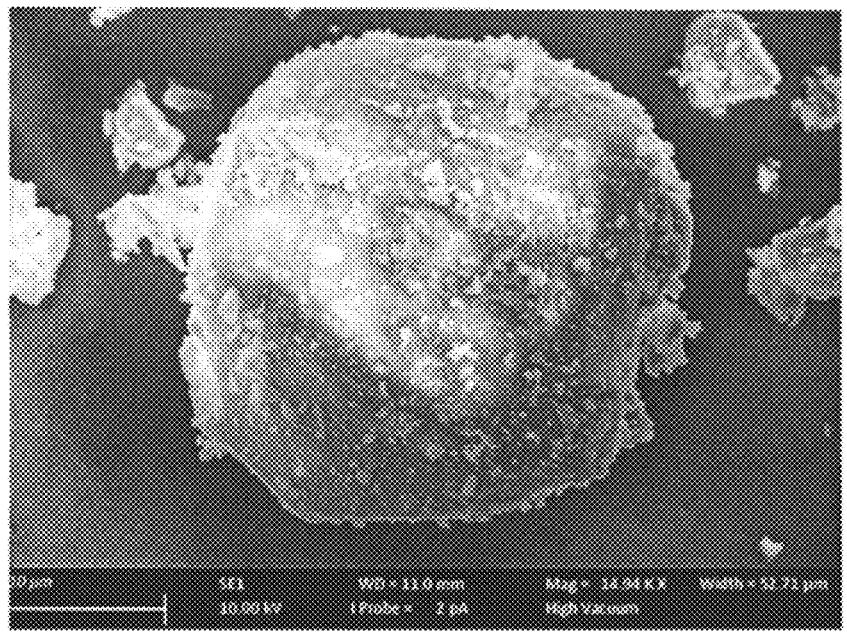
FIG. 3D shows an SEM image of Example 3.

FIG. 3D shows an SEM image of Example 3. The particle surface exhibits small, irregular flecks. It is assumed that these are $Y_2O_3$ particles lying thereon.

Figure 3E:
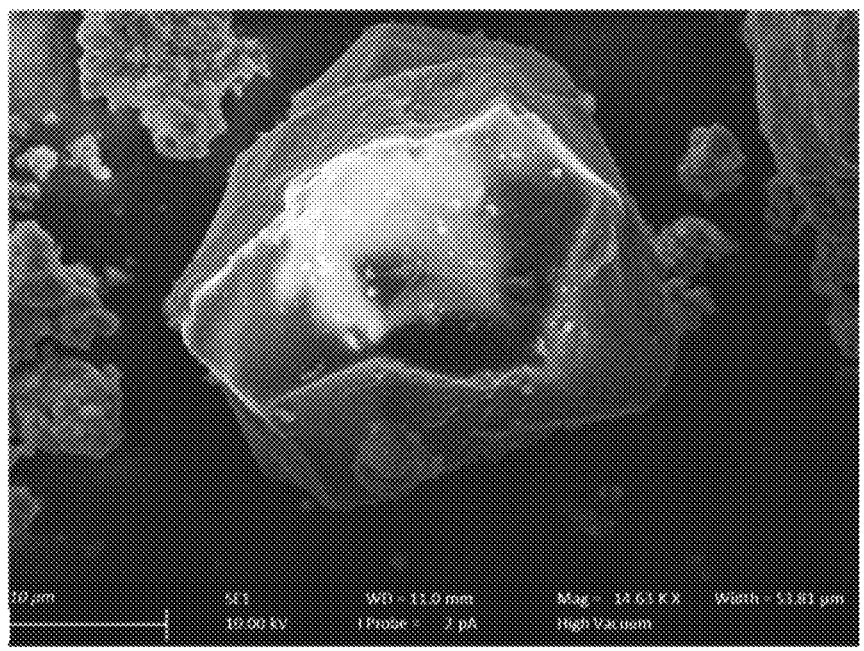
FIG. 3E shows an SEM image of Example 1.1.

FIG. 3E shows an SEM image of Example 1.1. The surface of the phosphor is smoother than that of Example 3.

Figure 3F:
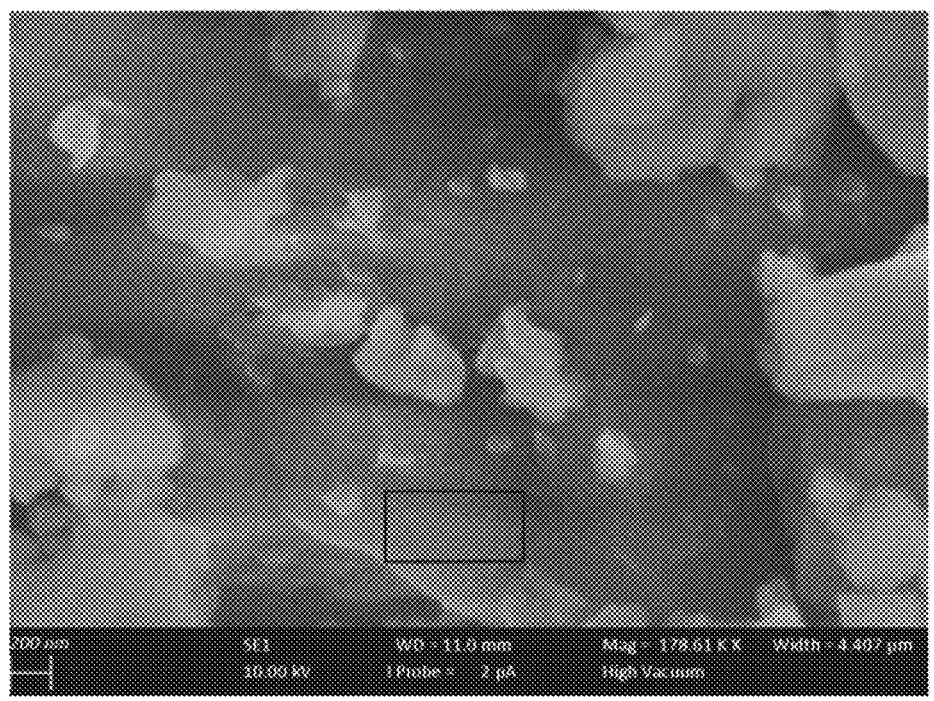
FIG. 3F shows an SEM image of an uncoated phosphor.

FIG. 3F shows an SEM image of an uncoated phosphor, only a section (black frame) being considered. It can be recognized that, aside from fleck-like fragments of the phosphor, no coating can be identified on the particle surface (see black frame).

Figure 3G:
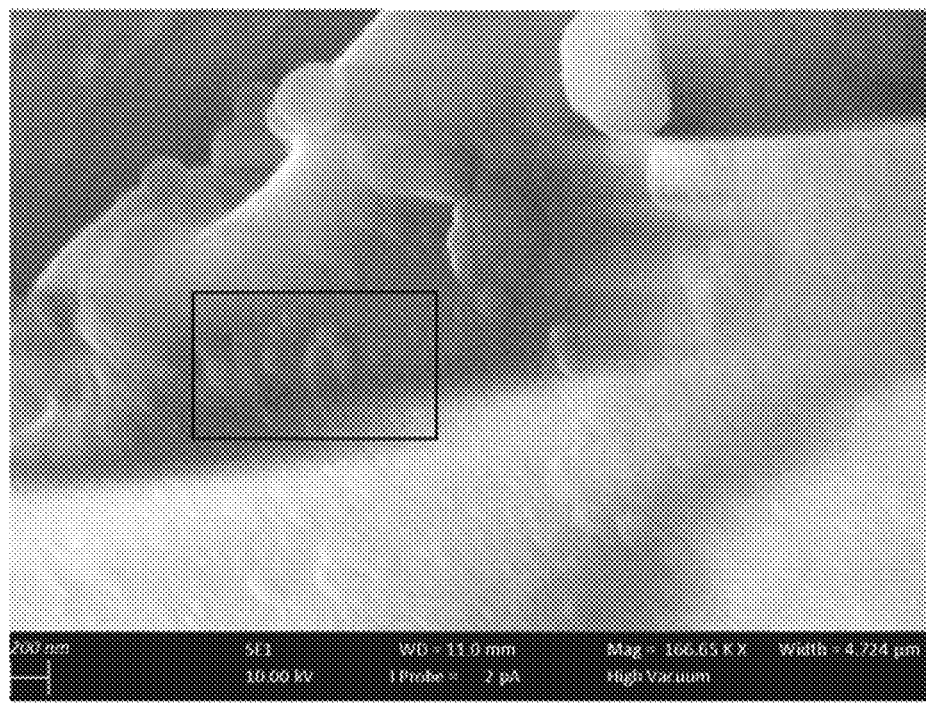
FIG. 3G shows an SEM image of Example 1.1.

FIG. 3G shows an SEM image of Example 1.1. Here, likewise, only a section is considered (black frame). Marked elevations can be identified on the surface, which can be attributed to the glass-like $SiO_2$ coating (see black frame).

APPLICATION EXAMPLES

The procedure was analogous to the examples from EP 21157055.1. Methods, devices and materials were identical to those from EP 21157055.1. Only the phosphor according to the invention (aftertreated) was substituted.

Testing of Antimicrobial Efficacy

Aqueous curable compositions were prepared as per Table 1 and Table 2.

50 g of glass beads were added to the respective composition and the mixture was ground in a Speedmixer at 2000 rpm for 5 min. After filtering off the glass beads, the respective composition was coated onto a high-gloss rolled aluminium panel and crosslinked to form a film having a dry film thickness of 50 μm. There is then a coating on the substrate, the coating surface of which should have an antimicrobial action, and the reference thereof without expected antimicrobial action. Comparative Examples CE1 and CE2 do not contain any phosphors.

TABLE 1

|  | CE1 [g] | C1-1 [g] | C1-2 [g] |
|---|---|---|---|
| Silikopur 8081 (Evonik) | 91.99 | 91.09 | 90.66 |
| Water | 3 | 3 | 3 |
| $CaLi_2SiO_4:Pr^{3+}$, $Na^+$(1%) $CaF_2$, aftertreated with TEOS/TMOS |  | 0.90 | 1.33 |
| TIB Kat ® 218 | 0.01 | 0.01 | 0.01 |
| Desmodur ® N 3100 | 5 | 5 | 5 |

Silikopur 8081 is an air-drying aqueous silicone-modified polyurethane dispersion from Evonik.

TABLE 2

|  | CE2 [g] | C2-1 [g] | C2-2 [g] |
|---|---|---|---|
| Mobilit Idm7991 (aqueous acrylate dispersion), Celanese | 82 | 81.1 | 80.67 |
| Dowanol dpnb (Dow)/butyl glycol mixture (1:1) | 8 | 8 | 8 |
| $CaLi_2SiO_4:Pr^{3+}$, $Na^+$(1%) $CaF_2$, aftertreated with TEOS/TMOS |  | 0.90 | 1.33 |
| Desmodur ® N 3100 | 10 | 10 | 10 |

The transfer method was carried out analogously to EP21157055.1.

It was found that the coatings C1-1, C1-2 and C2-1, C2-2 according to the invention have antimicrobial action.

The invention claimed is:

1. A water-based curable composition for the production of coatings having an antimicrobial property, the composition comprising:
    at least one film-forming polymer,
    optionally, at least one additive,
    optionally, at least one curing agent, and
    at least one up-conversion phosphor of the general formula (IIa)

$$Ca_{1-2b}Pr_bNa_bLi_2SiO_4 \qquad (IIa)$$ 

wherein b=0.0001 to 0.5000;
    wherein the at least one up-conversion phosphor, as a result of an aftertreatment, includes at least one material which has a band gap of greater than 6.0 electronvolts (eV) and is hydrolysis-stable and preserves an up-conversion emission of the phosphor in aqueous environments.

2. The composition according to claim 1, wherein the at least one material has a band gap of at most 12 electronvolts (eV).

3. The composition according to claim 1, wherein the at least one material is selected from the group consisting of an oxide, a silicate, a borate, a phosphate of an inorganic material, and a mixture thereof.

4. The composition according to claim 1, wherein the at least one material is selected from the group consisting of $SiO_2$, α—$Al_2O_3$, MgO, $MgAl_2O_4$, a Ca polyphosphate, a Sr polyphosphate, a Ca or Sr pyrophosphate $(Ca_{1-x}Sr_x)_3P_2O_7$ wherein x=0.0 to 1.0, and a mixture thereof.

5. The composition according to claim 1, wherein the at least one material has been formed on the at least one up-conversion phosphor, as a result of the aftertreatment with a starting material.

6. The composition according to claim 5, wherein the starting material is a tetraalkyl orthosilicate, in which the alkyl groups, on each occurrence, have 1 to 10 carbon atoms.

7. The composition according to claim 5, wherein the starting material is selected from the group consisting of tetramethyl orthosilicate, tetraethyl orthosilicate, tetra-n- propyl orthosilicate, tetraisopropyl orthosilicate, tetrabutyl orthosilicate, and a mixture thereof.

8. The composition according to claim 1, wherein the at least one up-conversion phosphor, after the aftertreatment, has a crystalline core with a glass-forming or amorphous coat.

9. The composition according to claim 1, wherein the at least one up-conversion phosphor, prior to the aftertreatment, has been prepared with at least one flux.

10. The composition according to claim 9, wherein the at least one flux is at least one substance selected from the group consisting of an ammonium halide, an alkali metal halide, an alkaline earth metal halide, and a lanthanoid halide.

11. The composition according to claim 10, wherein the ammonium halide, the alkali metal halide, the alkaline earth metal halide, and the lanthanoid halide comprises a halide selected from the group consisting of fluoride, bromide, and chloride.

12. The composition according to claim 10, wherein an alkali metal of the alkali metal halide is potassium, sodium, or lithium.

13. The composition according to claim 10, wherein a lanthanoid of the lanthanoid halide is praseodymium.

14. The composition according to claim 10, wherein an alkaline earth metal of the alkaline earth metal halide is calcium or strontium.

15. The composition according to claim 1, wherein the at least one up-conversion phosphor is a crystalline silicate or consists of crystalline silicates doped with lanthanoid ions, wherein the at least one up-conversion phosphor comprises at least one alkali metal ion and at least one alkaline earth metal ion.

16. The composition according to claim 1, wherein the at least one up-conversion phosphor is at least partially crystalline.

17. A water-based curable composition for the production of coatings having an antimicrobial property, the composition comprising:
at least one film-forming polymer,
optionally, at least one additive,
optionally, at least one curing agent, and
at least one up-conversion phosphor of the general formula (IIa)

$Ca_{1-2b}Pr_bNa_bLi_2SiO_4$ (IIa)

wherein b=0.0001 to 0.5000;
wherein the at least one up-conversion phosphor, as a result of an aftertreatment, includes at least one material which has a band gap of greater than 6.0 electronvolts (eV) and is hydrolysis-stable.

18. The composition according to claim 1, wherein the at least one up-conversion phosphor is $Ca_{0.98}Pr_{0.01}Na_{0.01}Li_2SiO_4$ or $Ca_{0.94}Pr_{0.03}Na_{0.03}Li_2SiO_4$.

19. The composition according to claim 10, wherein the at least one up-conversion phosphor includes a halogen corresponding to a halide of the at least one flux.

20. The composition according to claim 1, wherein the at least one up-conversion phosphor which, on irradiation with electromagnetic radiation having lower energy and longer wavelength in the range from 2000 to 400 nm, emits electromagnetic radiation having higher energy and shorter wavelength in the range from 400 to 100 nm, where an intensity of an emission maximum of the electromagnetic radiation having higher energy and shorter wavelength is an intensity of at least $1 \cdot 10^3$ counts/(mm$^{2*}$s).

21. The composition according to claim 17, wherein the at least one up-conversion phosphor according to formula (IIa) has XRPD reflections in a range from 23° 2θ to 27° 2θ and from 34° 2θ to 39.5° 2θ.

22. The composition according to claim 1, wherein the at least one film-forming polymer contains functional groups that are reactive with an isocyanate-containing curing agent or with a catalyst.

23. The composition according to claim 1, wherein the at least one film-forming polymer is selected from the group consisting of a hydroxy-functional acrylate polymer, a hydroxy-functional polyester polymer, a hydroxy-functional polyether polymer, a hydroxy-functional cellulose derivative, an amino-functional aspartic polymer, and a polyester polymer, and
wherein the at least one film-forming polymer is capable of reacting with an isocyanate-containing curing agent.

24. The composition according to claim 1, wherein the at least one film-forming polymer has low resonance.

25. The composition according to claim 1, wherein a transmittance of the at least one film-forming polymer is at least 75%, measured by a twin-beam UV/VIS spectrometer.

26. The composition according to claim 1, wherein a transmittance of the composition is at least 70%, measured by a twin-beam UV/VIS spectrometer.

27. The composition according to claim 1, wherein the at least one up-conversion phosphor has an average particle size of d50=0.1-50 μm, measured to ISO 13320:2020 and USP 429.

28. The composition according to claim 1, wherein the at least one additive is selected from the group consisting of a dispersant, a rheology aid, a levelling agent, a wetting agent, a defoamer, and a UV stabilizer.

29. The composition according to claim 1, wherein the at least one curing agent is selected from the group consisting of an aliphatic isocyanate and a cycloaliphatic isocyanate.

30. The composition according to claim 1, wherein a coating produced therefrom has antimicrobial action against bacteria, yeasts, molds, algae, parasites, spores, or viruses.

31. The composition according to claim 1, wherein a coating produced therefrom has antimicrobial action against pathogens of nosocomial infections, pathogenic environmental organisms, or pathogens in food and drink.

32. A phosphor, wherein the phosphor is
a compound of formula (IIa),

$Ca_{1-2b}Pr_bNa_bLi_2SiO_4$ (IIa)

wherein in formula (IIb), b=0.0001 to 0.5000; and
wherein the phosphor has a crystalline core with a glass-forming coat.

33. The phosphor according to claim 32, wherein the glass-forming coat consists of a material having a band gap of greater than 6.0 electronvolts (eV).

34. The phosphor according to claim 33, wherein the glass-forming coat consists of a material having a band gap of less than 12.0 electronvolts (eV).

35. The phosphor according to claim 33, wherein the material is selected from the group consisting of an oxide, a silicate, a borate, a phosphate of an inorganic material, and a mixture thereof.

36. The phosphor according to claim 33, wherein the material is selected from the group consisting of $SiO_2$, $\alpha$—$Al_2O_3$, MgO, $MgAl_2O_4$, a Ca polyphosphate, a Sr polyphosphate, a Ca or Sr pyrophosphate $(Ca_{1-x}Sr_x)_3P_2O_7$ wherein x=0.0-1.0, and a mixture thereof.

37. The phosphor according to claim 32, wherein the crystalline core has been produced with at least one flux.

\* \* \* \* \*